US007118299B2

(12) United States Patent
Gregel et al.

(10) Patent No.: US 7,118,299 B2
(45) Date of Patent: Oct. 10, 2006

(54) REINFORCING BAR CONNECTION AND METHOD

(75) Inventors: John J. Gregel, Bedford, OH (US); Colleen M. Kerkay, Olmsted Township, OH (US); Mark V. Samas, Willoughby Hills, OH (US); Wilhelmus G. Th. Maas, Eethen (NL); Louis J. Colarusso, Macedonia, OH (US)

(73) Assignee: ERICO International Corporation, Solon, OH (US)

( * ) Notice: Subject to any disclaimer, the term of this patent is extended or adjusted under 35 U.S.C. 154(b) by 84 days.

(21) Appl. No.: 10/697,509

(22) Filed: Oct. 30, 2003

(65) Prior Publication Data

US 2004/0086330 A1 May 6, 2004

Related U.S. Application Data

(63) Continuation-in-part of application No. 10/055,551, filed on Jan. 23, 2002, now Pat. No. 6,719,478.

(60) Provisional application No. 60/263,860, filed on Jan. 23, 2001.

(51) Int. Cl.
*F16B 2/14* (2006.01)

(52) U.S. Cl. ...................... 403/305; 403/310; 403/369; 403/374.1

(58) Field of Classification Search ................ 403/310, 403/309, 300, 311, 314, 301, 302, 305, 369, 403/374.1; 52/726.1, 583.1; 24/136 R, 24/115 M
See application file for complete search history.

(56) References Cited

U.S. PATENT DOCUMENTS 50,190 A 9/1865 Watson
373,789 A * 11/1887 Trovillion ................. 24/136 R (Continued)

FOREIGN PATENT DOCUMENTS

DE 1 659 247 2/1971

(Continued)

OTHER PUBLICATIONS

Blitz Splice The Ultimate Rebar Connection a simple, low-cost and better system for cold splicing all sizes of (4-18") Rebar, PM Blitz Coupler, Blitz Corporation. Brochure, 4 pages.

(Continued)

*Primary Examiner*—James R. Brittain
(74) *Attorney, Agent, or Firm*—Renner, Otto, Boisselle and Sklar, LLP

(57) ABSTRACT

A high strength reinforcing bar splice uses a contractible jaw assembly bridging the bar ends to be joined. The jaw assembly includes interior teeth designed to bite into the projecting ribs or deformations on the outside of the bar ends which form the overall diameter of the bar but not the core or nominal diameter of the bar. The jaw assembly is constricted from both axial ends by driving tapered locking collars on each end of the jaw assembly with a tool while concurrently causing the jaw assembly to constrict and bite into the bar ends. When the tool is removed, the collars remain in place locking the jaw assembly closed. The splice provides not only high tensile and compressive strengths but also has good fatigue and dynamic strength to qualify as a Type 2 coupler.

28 Claims, 14 Drawing Sheets

U.S. PATENT DOCUMENTS

| | | | | |
|---|---|---|---|---|
| 391,226 | A * | 10/1888 | Bowden | 403/314 |
| 1,337,642 | A * | 4/1920 | Clark | 403/311 |
| 1,377,101 | A | 5/1921 | Sparling | |
| 2,441,304 | A * | 5/1948 | West | 174/178 |
| 2,652,273 | A * | 9/1953 | Davis | 403/300 |
| 3,117,485 | A * | 1/1964 | Jansen | 411/427 |
| 3,480,309 | A | 11/1969 | Harris | |
| 3,551,999 | A | 1/1971 | Gutmann | |
| 3,614,140 | A * | 10/1971 | Nestor | 403/369 |
| 3,769,678 | A | 11/1973 | Marsden | |
| 3,852,850 | A * | 12/1974 | Filhaber | 24/136 R |
| 3,891,294 | A | 6/1975 | Philibert | |
| 3,969,920 | A | 7/1976 | Marsden et al. | |
| 4,239,246 | A * | 12/1980 | Howlett | 279/121 |
| 4,241,490 | A | 12/1980 | Edwards | |
| 4,408,926 | A | 10/1983 | Werner | |
| 4,469,465 | A | 9/1984 | Andrus | |
| 4,508,409 | A * | 4/1985 | Cherry et al. | 439/391 |
| 4,710,052 | A | 12/1987 | Elger | |
| 4,848,971 | A | 7/1989 | Price, Jr. | |
| 4,850,777 | A | 7/1989 | Lawrence et al. | |
| 4,872,626 | A * | 10/1989 | Lienart | 248/63 |
| 4,941,303 | A * | 7/1990 | Jartoux | 52/223.13 |
| 5,022,125 | A * | 6/1991 | Biass | 24/136 R |
| 5,193,932 | A | 3/1993 | Wu | |
| 5,308,184 | A | 5/1994 | Bernard | |
| 5,683,273 | A * | 11/1997 | Garver et al. | 439/784 |
| 6,089,779 | A | 7/2000 | Lancelot, III | |
| 6,099,196 | A | 8/2000 | Lancelot, III | |
| 6,719,478 | B1 * | 4/2004 | Gregel et al. | 403/310 |
| 2002/0110413 | A1 | 8/2002 | Gregel et al. | |

FOREIGN PATENT DOCUMENTS

| | | |
|---|---|---|
| EP | 1 225 284 | 1/2002 |
| FR | 2 558 904 | 1/1984 |
| GB | 569729 | 6/1945 |
| GB | 974442 | 11/1964 |
| GB | 1432888 | 4/1976 |
| WO | 93/24257 | 12/1993 |
| WO | 00/66852 | 11/2000 |
| WO | 2004/022876 | 3/2004 |

OTHER PUBLICATIONS

CCL α Alpha Splice, CCL Systems Limited. Brochure, 4 pages.
Reinforcement Anchorages and Splices, Fourth Edition 1997. Concrete Reinforcing Steel Institute, Prepared under the direction of the CRSI Engineering Practice Committee by the Committee on Reinforcement Anchorages and Splices.
The Ultimate Stress Splicer for Full Positive Connections, Stricon Products Ltd. Brochure, 8 pages including Tension Splice Test Data Summary.
Quick Wedge, Erico, Inc. 1992. Brochure, 4 pages.

* cited by examiner

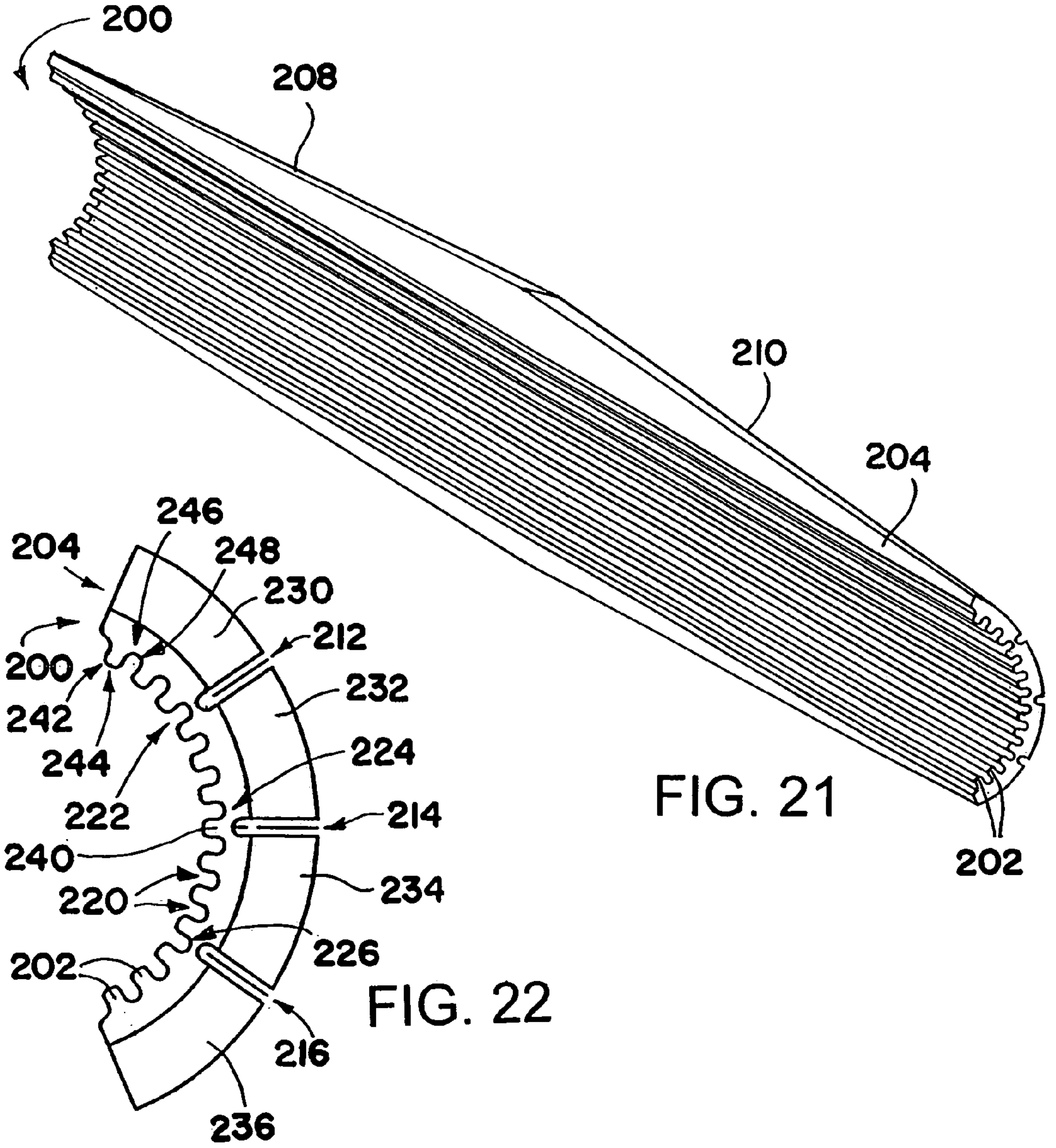
FIG. 21
FIG. 22
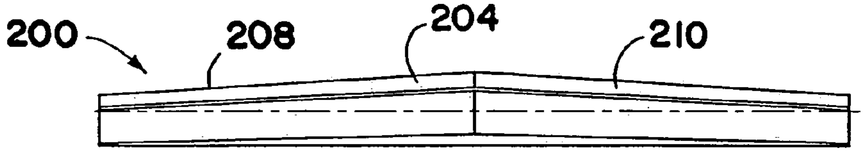
FIG. 23
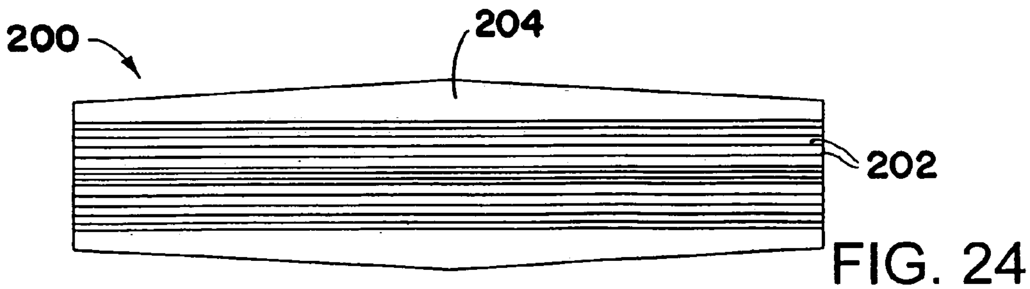
FIG. 24

REINFORCING BAR CONNECTION AND METHOD

This application is a continuation in part of U.S. application Ser. No. 10/055,551, filed Jan. 23, 2002, now U.S. Pat. No. 6,719,478 which claims priority under 35 USC 119(e) of U.S. Provisional Application No. 60/263,860, filed Jan. 23, 2001. Both of the preceding applications are hereby incorporated by reference in their entireties.

TECHNICAL FIELD

This invention relates generally as indicated to a reinforcing bar connection, and more particularly to a high strength reinforcing bar splice which provides not only high tensile and compressive strengths, but also has the dynamic and fatigue characteristics to qualify as a Type 2 coupler approved for all United States earthquake zones. The invention also relates to a method of making the connection.

BACKGROUND OF THE INVENTION

In steel reinforced concrete construction, there are generally three types of splices or connections; namely lap splices; mechanical splices; and welding. Probably the most common is the lap splice where two bar ends are lapped side-by-side and wire tied together. The bar ends are of course axially offset which creates design problems, and eccentric loading whether compressive or tensile from bar-to-bar. Welding is suitable for some bar steels but not for others and the heat may actually weaken some bars. Done correctly, it requires great skill and is expensive. Mechanical splices normally require a bar end preparation or treatment such as threading, upsetting or both. They also may require careful torquing. Such mechanical splices don't necessarily have high compressive and tensile strength, nor can they necessarily qualify as a Type 2 mechanical connection where a minimum of five couplers must pass the cyclic testing procedure to qualify as a Type 2 splice in all United States earthquake zones.

Accordingly, it would be desirable to have a high strength coupler which will qualify as a Type 2 coupler and yet which is easy to assemble and join in the field and which does not require bar end preparation or torquing in the assembly process. It would also be desirable to have a coupler which could be assembled initially simply by sticking a bar end in an end of a coupler sleeve or by placing a coupler sleeve on a bar end.

SUMMARY OF THE INVENTION

A reinforcing bar connection for concrete construction utilizes a contractible jaw or assembly which is closed around aligned bar ends to form the joint and tightly grip the bars. The jaw assembly is closed from each axial end to constrict around and bridge the ends of end-to-end reinforcing bars. The jaws of the assembly have teeth which bite into the ends of the bar. The assembly is constricted by forcing self-locking taper sleeves or collars over each end which hold the jaw constricted locking the bars together. The teeth are designed to bite into the ribs or projecting deformations on the surface of the bar which forms the overall diameter, but not bite into the core or nominal diameter of the bar. In this manner, the splice does not affect the fatigue or ultimate strength properties of the bar while providing a low slip connection. The jaw segments may be held assembled by a frangible plastic frame. The configuration of the jaws limits the contraction and precludes undue penetration of the bar by the teeth. The connection or splice has high tensile and compressive strength and will pass the dynamic cycling and/or fatigue requirements to qualify as a Type 2 coupler. No bar end preparation or torque application is required to make the coupling. In the method, the closing and locking occur concurrently with a simplified tool to enable the splice to be formed easily and quickly.

According to an aspect of the invention, a reinforcing bar splice includes at least two contractible jaw elements configured to engage ends of generally axially aligned reinforcing bars, wherein the jaw elements each have tapered outer surfaces sloping up from both ends of the jaw element; and tapered collars for engaging the tapered outer surfaces of the jaw elements to force the jaw elements, inward to grip ends of the reinforcing bars.

According to another aspect of the invention, a method of joining ends of substantially axially aligned reinforcing bars, the method comprising: placing jaw elements having tapered outer surfaces over ends of the reinforcing bars; and forcing the jaw elements inward to grip the ends of the reinforcing bars, wherein the forcing includes exerting an axial force on tapered lock collars placed on ends of the jaw elements.

According to still another aspect of the invention, a jaw element section for engaging reinforcing bars includes a wall; and teeth attached to an inner surface of the wall. The wall has a tapered outer surface. The wall has wall notches therein that define hinge points or reduced thickness. The jaw element section includes jaw elements hingedly coupled to one another at the hinge points.

According to yet another aspect of the invention, a reinforcing bar splice includes a jaw element section configured to engage ends of generally axially aligned reinforcing bars, wherein the jaw element section includes multiple jaw elements physically coupled together; and tapered collars for engaging tapered outer surfaces of the jaw element sections to force the jaw elements inward to grip ends of the reinforcing bars.

According to a further aspect of the invention, a method of joining ends of substantially axially aligned reinforcing bars includes the steps of: placing jaw elements having tapered outer surfaces over ends of the reinforcing bars; and forcing the jaw elements inward to grip the ends of the reinforcing bars, wherein the forcing includes exerting an axial force on tapered lock collars placed on ends of the jaw elements. The forcing includes driving teeth of the jaw elements into protrusions on a surface the reinforcing bars, without encroaching upon an underlying core of the reinforcing bars.

According to a still further aspect of the invention, a jaw element section for splicing ends of reinforcing bars, includes: a flexible web; and plural jaw elements coupled to the web. The jaw elements each include tapered outer surfaces and a toothed inner surface.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 21 is an oblique view of yet another embodiment jaw element in accordance with the present invention, a jaw element having longitudinal ribs, and having hinge points between jaw element sections;

FIG. 22 is an axial end elevation of the jaw element of FIG. 21;

FIG. 23 is a bottom elevation of the jaw element of FIG. 21;

FIG. 24 is a plan view elevation of the jaw element of FIG. 21;

DETAILED DESCRIPTION

Figure 1:
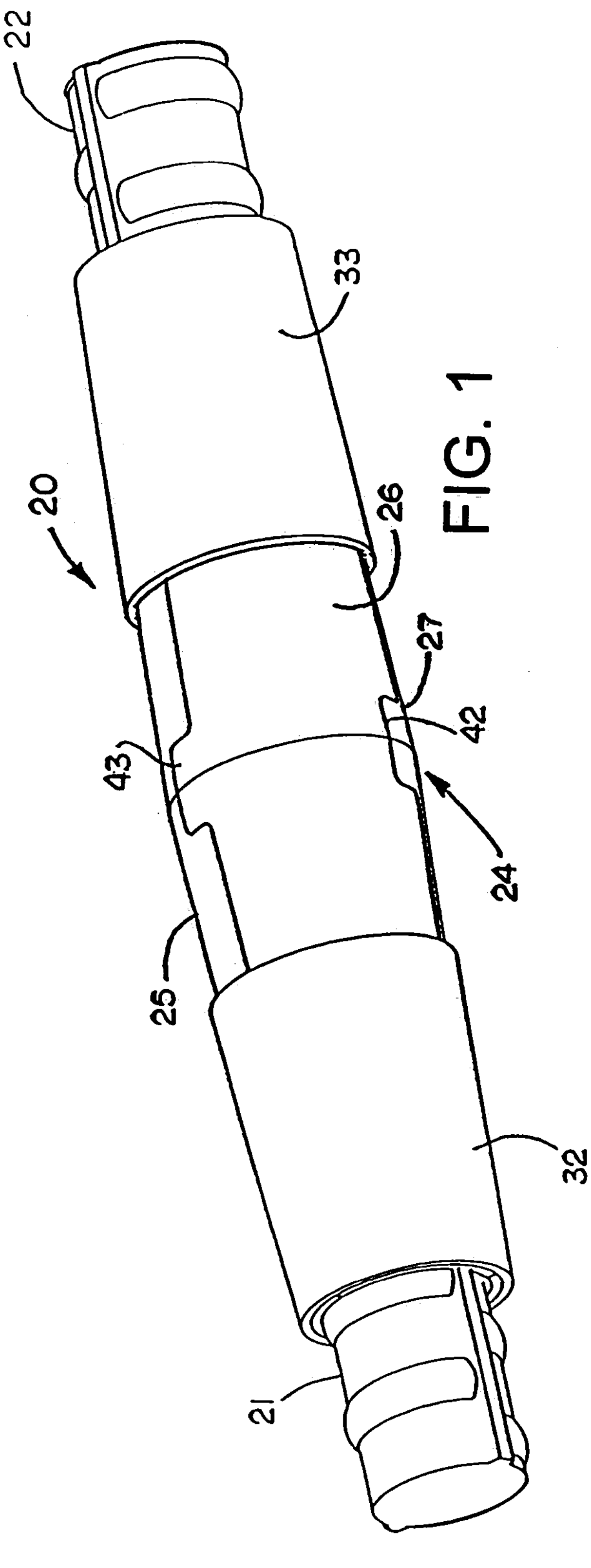
FIG. 1 is a perspective view of a completed or assembled splice in accordance with the invention.
Figure 2:
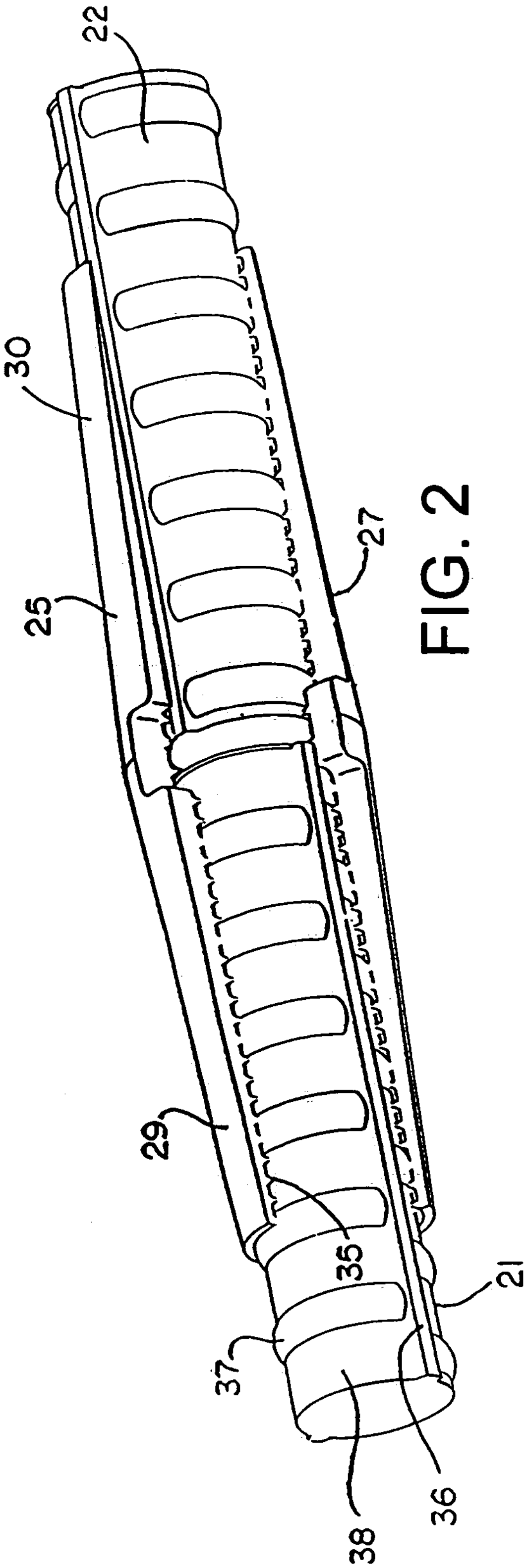
FIG. 2 is a similar view with the locking collars and one jaw of the assembled splice removed.

Referring initially to FIGS. 1 and 2, there is illustrated a reinforcing bar connection in accordance with the present invention shown generally at 20 joining end-to-end axially aligned deformed reinforcing bars 21 and 22. The reinforcing bars are shown broken away so that only the ends gripped by the splice or connection are illustrated. It will be appreciated that the bars may extend to a substantial length and may either be vertical, horizontal, or even diagonal in the steel reinforced concrete construction taking place. The connection and bars are designed to be embedded in poured concrete. The connection comprises a jaw assembly shown generally at 24, which includes three circumferentially interfitting three jaw elements shown at 25, 26 and 27. It will be appreciated that alternatively two jaw elements or more than three jaw elements may form the assembly 24.

As seen more clearly in FIG. 2, the exterior of the jaw elements forms oppositely tapering shallow angle surfaces seen at 29 and 30, on which are axially driven matching taper lock collars 32 and 33, respectively. When the lock collars 32 and 33 are driven toward each other, the jaw assembly 24 contacts driving the interior teeth shown at 35 on each jaw element into the deformed, or projecting portions, of the bar such as the longitudinal projecting ribs 36 and the circumferential ribs 37. The projecting rib formation on the exterior of the bars may vary widely, but most deformed bars have either a pattern like that shown or one similar to such pattern. The teeth 35 are designed to bite into such radial projections on the bar, but not into the core 38, which forms the nominal diameter of the bar. It should be again noted that in FIG. 2, the jaw element 26 has been removed as well as the lock collars 32 and 33 to illustrate the interior teeth 35.

Referring now to FIGS. 3 through 7, there is illustrated a single jaw 26. Each of the three jaws forming the jaw assembly 24 are identical in form. Each jaw is a one-piece construction and is preferably formed of forged steel heat treated and stress relieved. Other suitable possible methods of manufacture include casting, machining, and metal injection molding.

Figure 5:
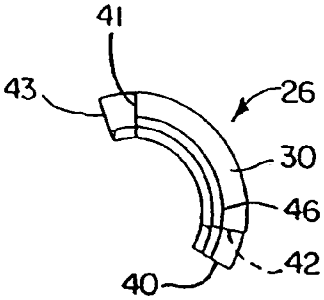
FIG. 5 is an axial end elevation of the jaw as seen from the right hand end of FIG. 4.

As seen more clearly in FIG. 5, since three jaw elements form the jaw assembly, each jaw element extends on an arc of approximately 120°. As seen more clearly in FIGS. 3 and 5, the 120° extends from one axial, or longitudinal, edge 40 to the other seen at 41. Such edges or seams between the jaw elements are axially parallel and uninterrupted except for the circumferential recesses 42 in the longitudinal edge 40 and the interfitting projection 43 on the longitudinal edge 41. Each projection 43 is designed to fit into the notch 42 of the circumferentially adjacent jaw element. The interfitting projections and notches ensure that the jaw elements do not become axially misaligned as the connection is formed. The interfitting circumferential projections and notches also ensure that the jaw assembly remains an assembly as the splice is formed. The interfit of the circumferential projections with the notches of adjacent jaw elements is seen more clearly in FIG. 1. The interfitting projections and notches may extend approximately 20° into or beyond the longitudinal seams.

Figure 4:
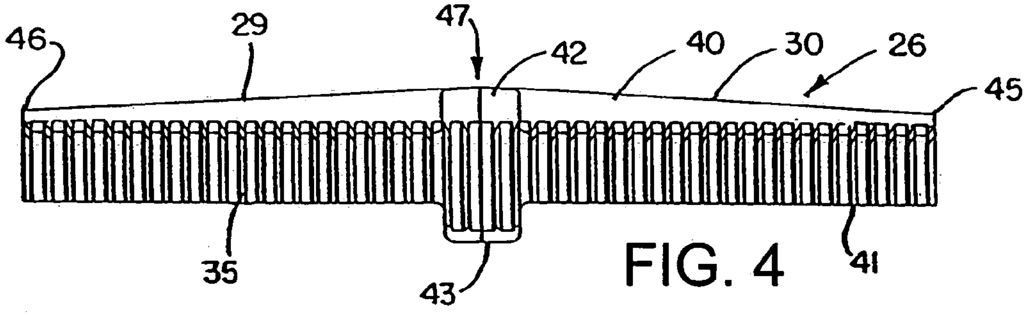
FIG. 4 is a bottom elevation of the jaw of FIG. 3.
Figure 6:
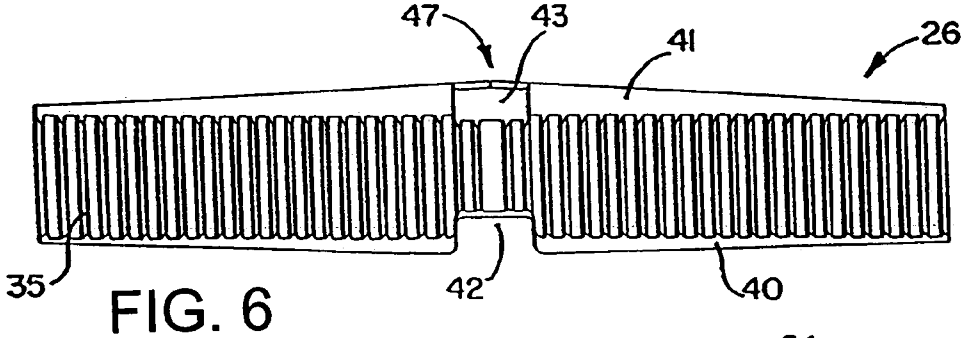
FIG. 6 is a plan view elevation of the jaw as seen from the left hand side of FIG. 5.

As seen more clearly in FIGS. 4 and 6, each jaw element tapers from its thinnest wall section at the opposite ends 45 and 46 to its thickest wall section shown in the middle at 47. The taper surfaces formed by the exterior of the jaw elements are low angle, self-locking tapers of but a few degrees and, of course, the tapers match the interior taper of the taper collars 32 and 33 which are driven axially on the end of the splice. The taper is preferably a low angle taper on the order from about one to about five degrees.

The taper exterior of the opposite ends of the jaw elements as well as the jaw assembly not only enables the matching lock collars to be driven on the splice, contracting the jaw elements with great force but locking them in contracted position. The configuration of the connection also enhances the dynamic and fatigue characteristics of the splice. This not only enhances the fatigue characteristics of the splice, but also enables the splice to qualify as a Type 2 coupler which may be used anywhere in a structure in any of the four earthquake zones of the United States.

Figure 7:
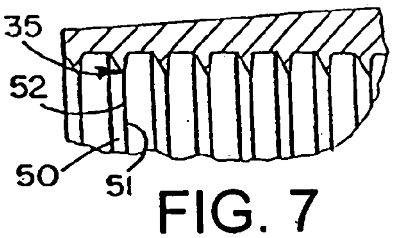
FIG. 7 is an enlarged axial section of a preferred jaw tooth profile.

Referring now to FIG. 7, it will be seen that the interior of each jaw element is provided with a series of relatively sharp teeth 35, which in the illustrated embodiment are shown as annular. However, it will be appreciated that a thread form of tooth may be employed. Each tooth 35 includes a sloping flank 50 on the side of the tooth toward the end of the jaw element. However, toward the middle of the jaw element, the tooth has an almost right angular flank 51 which meets flank 50 at the relatively sharp crown 52. The flank 50 may be approximately 60° with respect to the axis of the jaw element while the flank 51 that is almost 90°. It will be appreciated that the teeth 35 may alternatively have other suitable configurations.

As seen in comparing the left and right hand side of FIG. 6, the teeth on the opposite end are again arranged with the angled flank on the exterior while the sharper almost perpendicular flank faces the mid-point 47 of the jaw element.

As indicated, the inward projection of the teeth is designed to bite into the projecting deformations on the bar, but not into the core 38. As the teeth 35 press into the deformation, they provide additional cold working of the bar, resulting in better performance of the connection. By not pressing the teeth 35 into the core 38 of the bar, fatigue cracks and/or stress concentrations may thereby be avoided.

Figure 8:
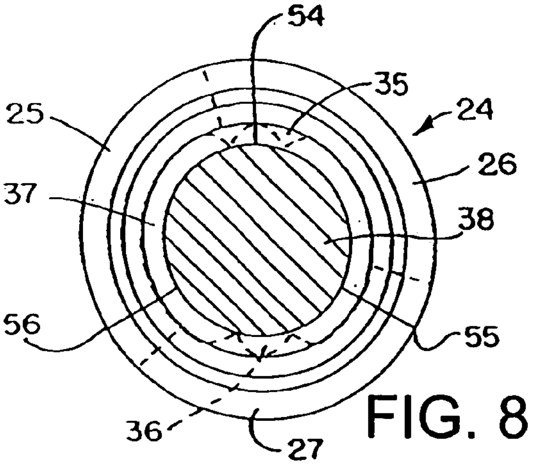
FIG. 8 is an axial end elevation with the bar in section of the jaw assembly contracted and gripping the bar ends.

The three jaw elements are shown in FIG. 8 closed with the teeth 35 of the jaw elements biting into the bar deformation projections 36 and 37, but not into the bar core 38. When closed, the three longitudinal seams between the jaw elements seen at 54, 55 and 56 will be substantially closed preventing further contraction of the jaw assembly keeping the teeth from biting into the core. The total contraction of the splice is controlled both by the circumferential dimensions and the axial extent to which the lock collars are driven on each end of the splice.

It will be appreciated that a transition splice may be formed with the present invention simply by reducing the interior diameter of one end of the splice so that the teeth on that end will bite into the projecting deformations on a smaller bar. The exterior configuration of the jaw elements may also change or remain the same with different size or identical locking collars driven on each end.

It will be appreciated that alternatively other means may be utilized for contracting internally-toothed jaw elements to clamp ends of reinforcing bars, for example by use of a radially-contracting collar or band.

Figure 10:
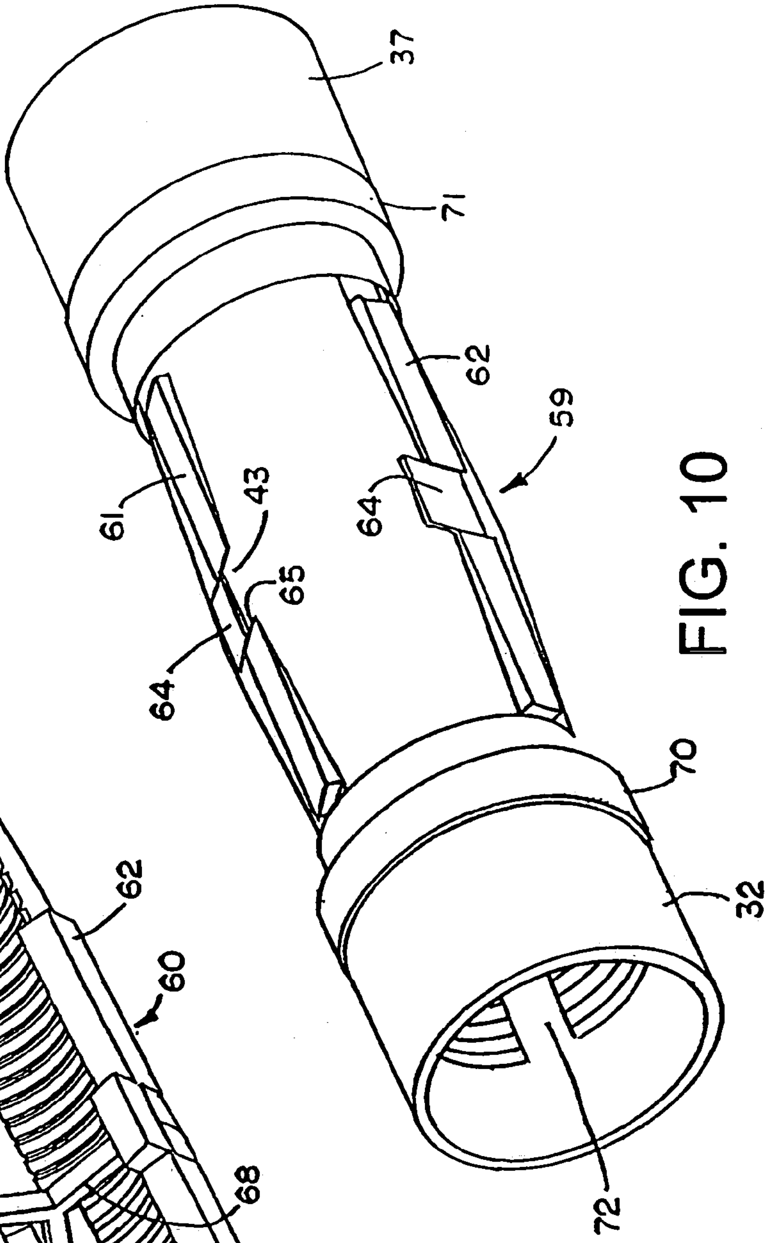
FIG. 10 is a similar perspective view of the splice assembly with the jaws open and locking collars assembled but not in locking positions.
Figure 9:
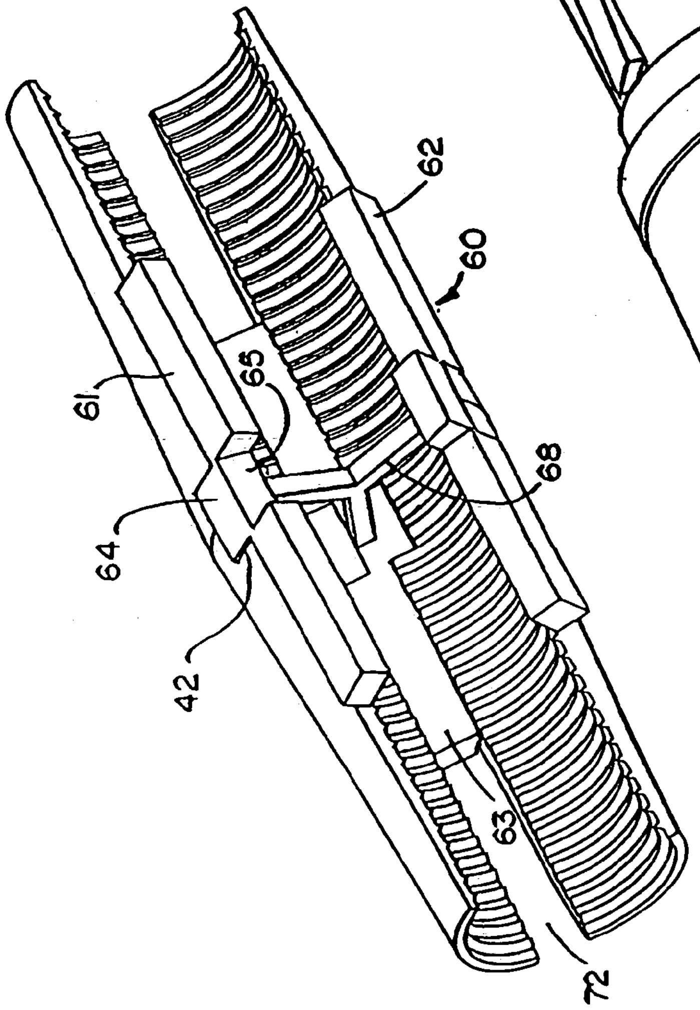
FIG. 9 is a perspective of a plastic spacer for assembling the jaw elements with one jaw removed for clarity of illustration.

Referring now to FIGS. 9 and 10, there is illustrated a splice assembly 59 where the jaw elements are held open and spaced from each other by a plastic spacer shown generally at 60. The plastic spacer comprises three generally axial or longitudinal elements seen at 61, 62 and 63, each of which includes a center lateral projection 64 and an opposite notch 65. The projection 64 snugly fits into the notch 42 of the jaw element while the notch 65 receives the projection 43 of the adjacent jaw element in a snug fit.

The three axially extending or longitudinal elements are held in place with respect to each other by the center three-legged triangular connection shown generally at 68, which also acts as a bar end stop. In this manner, the three jaw elements are held assembled and circumferentially spaced. Each locking collar may be positioned on the end of the assembled jaw elements as seen at 32 and 33 and held in place by a shrink wrap, for example, as seen at 70 and 71, in FIG. 10, respectively. In this manner, the jaw elements are held circumferentially spaced as seen by the gaps 72. The assembly seen in FIG. 10 may readily be slipped over the end of a reinforcing bar and the end of the bar will be positioned in the middle of the splice by contact of the bar end with the triangular leg center connection 68. When the opposite bar end is inserted into the open and assembled splice, the jaw assembly may then be closed by driving the two lock collars 32 and 33 axially toward each other. The force of driving on the lock collars will disintegrate not only the shrink wrap 70 and 71, but also the support 60 which is made preferably of a frangible or friable plastic material. This then permits the jaw assembly to close to the extent required to bite into the radial bar projections to form a proper high fatigue strength coupling joining the two bar ends.

Figure 11:
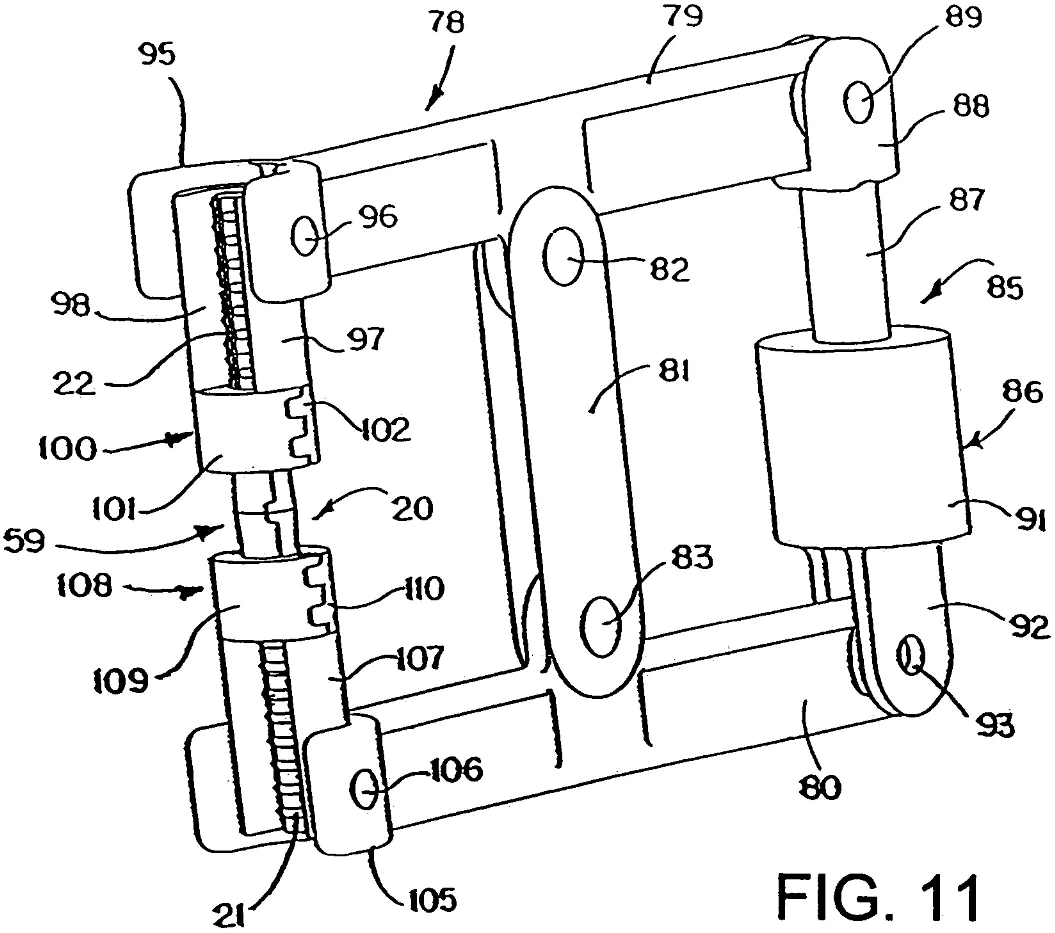
FIG. 11 is a perspective view of an installation tool for closing the jaw assembly from each axial end while placing locking collars on both axial ends.

Referring now to FIG. 11, there is illustrated a tool shown generally at 78 for completing the splice or connection of the present invention. Although the tool is shown connecting the bars 21 and 22 vertically oriented, it will be appreciated that the bars and splice may be horizontally or even diagonally oriented. The tool is preferably made of high strength aluminum members to reduce its weight and includes generally parallel levers 79 and 80 connected by center link 81 pivoted to the approximate mid-point of such levers as indicated at 82 and 83. Connecting the outer or right hand end of the levers 79 and 80 is an adjustable link shown generally at 85 in the form of a piston-cylinder assembly actuator 86. The adjustable link may also be a turnbuckle or air motor, for example. The rod 87 of the assembly is provided with a clevis 88 pivoted at 89 to the outer end of lever 79. The cylinder of the assembly 91 is provided with a mounting bracket or clevis 92 pivoted at 93 to the outer end of lever 80.

The opposite end of the lever 79 is provided with a C-shape termination pivoted at 96 to a C-shape tubular member 97 having an open side 98. A wedge driving collar shown generally at 100 is mounted on the lower end of the open tube 97. The collar is formed of hinged semi-circular halves 101 and 102. When closed and locked, the wedge collar has an interior taper matching that of the taper collars 32 or 33.

The lower arm 80 similarly is provided with a C-termination 105 pivoted at 106 to open tube 107 supporting wedge collar 108 formed of pivotally connected semicircular halves 109 and 110.

In order to make a splice, the coupler or splice assembly 59 seen more clearly in FIG. 10 is aligned with a first bar 21, for example. The coupler assembly is then slid onto the bar end. A second bar 22 is then positioned in line with a coupler and the second bar is slid into position such that the coupler is centered between both bars. The bar ends will contact the triangular spider connection in the center of the bar splice assembly to ensure that the bar ends are properly seated with respect to the coupler assembly. The tool with the wedge collars 100 or 108 open is then positioned over the bars. The wedge collars are closed and the actuator, or piston cylinder assembly 86, is extended to drive the wedge collars toward each other, driving the taper lock collars 32 and 33 on the jaw assembly to the position seen in FIG. 1, forming the splice 20. The wedge collars 100 and 108 are then opened and the tool removed. The taper lock collars 32 and 33 remain in place. When the taper lock collars are driven on the ends of the splice or connection, the jaw elements contract and the teeth on the interior bite into the projecting deformations on the bar ends, but do not bite into the core diameter of the bar.

The tool 78 shown in FIG. 11 and described above is but one example of a suitable tool for completing a splice. Other examples of suitable tools are shown in co-pending, commonly-assigned application Ser. No. 10/055,399, titled "Reinforcing Bar Tool and Method," filed Jan. 23, 2002, which is hereby incorporated by reference in its entirety.

Figure 12:
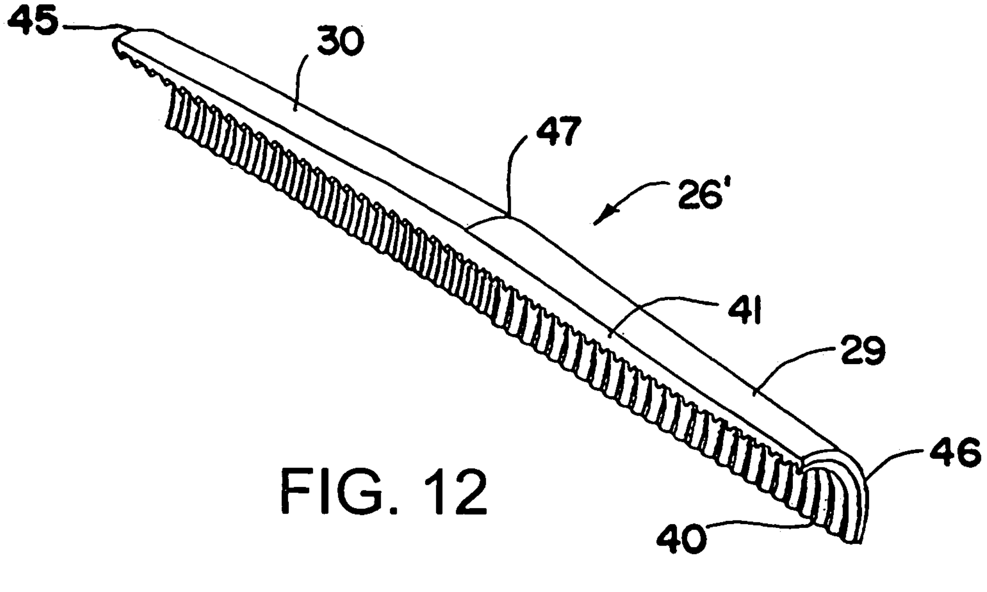
FIG. 12 is an oblique view of an alternate embodiment jaw element.

FIG. 12 shows a jaw element 26', an alternative embodiment of the jaw element 26 shown above in FIGS. 3–7. The jaw element 26' shown in FIG. 12 differs from the jaw element 26 shown in FIGS. 3–7 in that the jaw element 26' lacks the notch 42 and the interfitting projection 43 of the earlier embodiment. Thus the jaw element 26' has straight longitudinal edges 40 and 41. In addition, the jaw element 26' has some features in common with the jaw elements 26, such as shallow angle surfaces 29 and 30 that are thinnest at ends 45 and 46 and that meet at a middle 47.

Turning now to FIGS. 13–16, a jaw element section 120 has hinges to allow better conformance between the jaw element section 120 and reinforcing bars to which it is coupled. The jaw element section 120 has a series of annular teeth 122 protruding inwardly from a wall 124. The teeth 122 have tooth notches 126, 127, and 128 therein. The wall 124 has wall notches 130, 131, and 132 therein. The tooth notches 126–128 and the wall notches 130–132 define a series of jaw elements 134–140 separated by hinge points 144, 146, and 148. As explained further below, the jaw elements 134–140 are able to move relative to one another by bending of the jaw element section 120 at the hinge points 144, 146, and 148, extending along the length of the jaw element sections 120, causing relative pivoting of adjacent of the jaw elements 134, 136, 138, and 140.

The wall 124 of the jaw element section 120 has tapering shallow angle outer surfaces 152 and 154, which may be similar to the shallow angle surfaces 29 and 30 of the jaw element 25 (FIG. 2), for cooperating with the corresponding taper lock collars to press the jaw element section 120 against reinforcing bars, in joining the reinforcing bars together. Thus the wall 124 is at its thinnest at both of ends 156 and 158 of the jaw element section 120, and the wall 124 is at its thickest at a middle 160 of the jaw element section 120.

The jaw element section 120 may have an extent of greater than 120 degrees and less than 180 degrees. The illustrated jaw element section 120 has an extent of about 134 degrees, although will be appreciated that the jaw element may have a greater or lesser extent. More broadly, the jaw element section 120 may have an extent from about 125 to about 140 degrees or to about 150 degrees.

Figure 17:
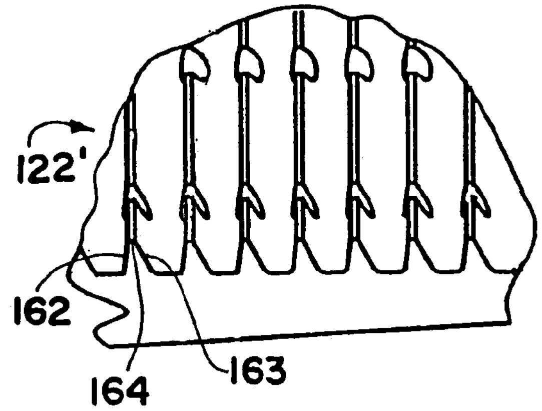
FIGS. 17 and 18 are fragmented side views of two alternative arrangements for the teeth of the jaw element of FIG. 13.
Figure 18:
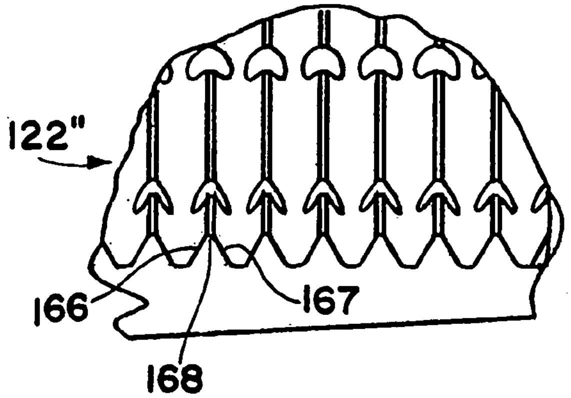

FIGS. 17 and 18 illustrate two possible configurations for the teeth 122. As illustrated in FIG. 17, the teeth may be teeth 122' having an asymmetric shape, with flanks 162 and 163, on opposite sides a crown 164, having different slopes. Alternatively, as illustrated in FIG. 18, the teeth may be teeth 122" having a symmetric shape, with flanks 166 and 167, on opposite sides of a crown 168, having substantially the same degree of slope.

Figure 3:
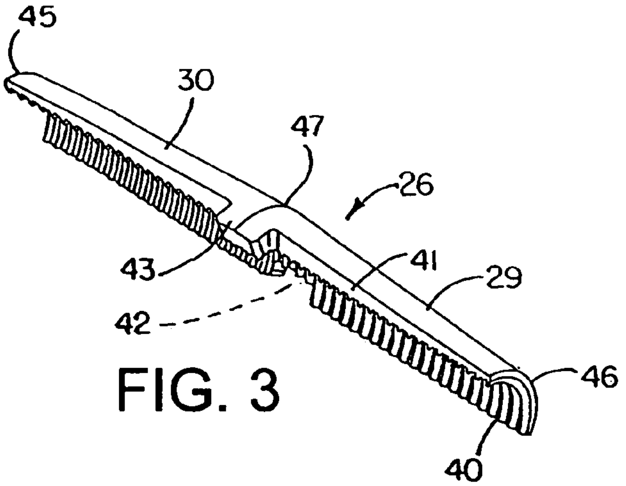
FIG. 3 is a perspective view of one of the jaws.

It will appreciated that symmetric teeth may in addition be utilized with other embodiments described above, such as with the jaw 26 shown in FIGS. 3–7, and described above. Although asymmetric teeth are shown in FIG. 3, it will be appreciated that symmetric teeth may be used instead of the asymmetric teeth.

Figure 19:
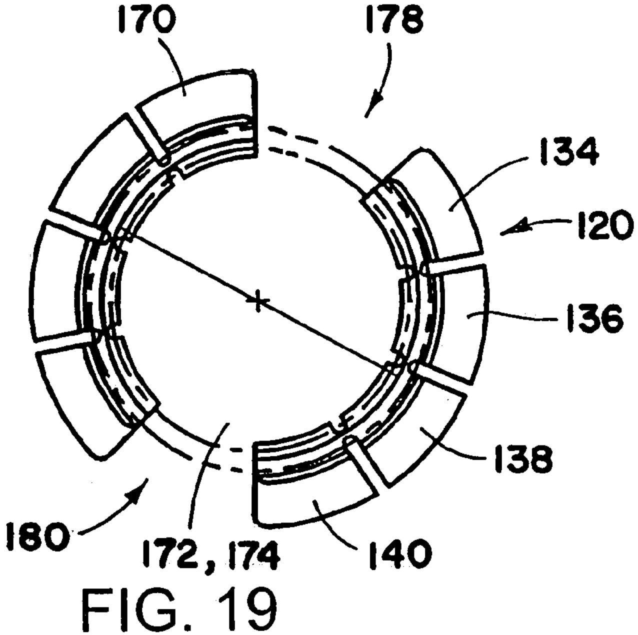
FIG. 19 is an end view illustrating use of two jaw elements of FIG. 13 to grip ends of reinforcing bars
Figure 20:
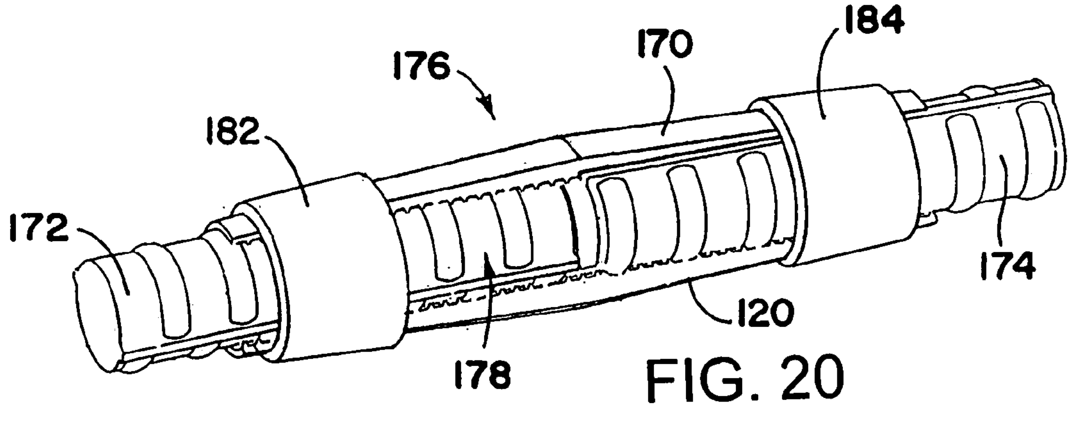
FIG. 20 is an oblique view illustrating the jaw elements of FIG. 19 as part of a splice, with tapered collars used to drive the jaw elements into contact with the ends of the reinforcing bars.

Thus, as shown in FIGS. 19 and 20, a pair of jaw element sections 120 and 170 may be used to join together ends of reinforcing bars 172 and 174 as part of a splice 176, with circumferential spaces or gaps 178 and 180 between the jaw element sections 120 and 170. The jaw element sections 120 and 170 may be substantially identical to one another, and may be placed substantially diametrically opposed on opposite sides of the reinforcing bars 172 and 174. The gaps 178 and 180 therefore may each have an extent of at least 40 degrees.

Taper lock collars 182 and 184 may be used to press the jaw element sections 120 and 170 against the reinforcing bars 172 and 174. Under force, as when taper lock collars 182 and 184 are driven onto the jaw element sections 120 and 170, jaw element sections (such as the jaw element 134–140 of the jaw element section 120) can pivot relative to one another about hinge points (such as the hinge points 144–148 of the jaw element section 120). This allows the jaw element sections 120 and 170 to conform better to and/or to better grip the reinforcing bars 172 and 174. This may allow compensation for difference in sizes of the reinforcing bars 172 and 174, and/or for slight misalignments of the reinforcing bars 172 and 174 relative to one another. Also, misalignments of the jaw element sections 120 and 170 may be compensated for by relative movement of the jaw element sections of the jaw element sections 120 and 170. Further, as with other embodiments described above, the pressure of the taper lock collars 182 and 184 against the outer surfaces 152 and 154 of the wall 124 may cause the annular teeth 122 to bite into or otherwise deform protrusions on the reinforcing bars 172 and 174. Alternatively or in addition, the annular teeth 122 may deform as the jaw element sections 120 and 170 are pressed by the taper lock collars 182 and 184 against the reinforcing bars 172 and 174.

It will be appreciated that the embodiment shown in FIGS. 13–20 may offer several advantages over embodiments described earlier. First, the number of jaw elements may be reduced, such as from three or more jaw elements (as illustrated for example in FIG. 1) to two jaw elements (as illustrated in FIGS. 19 and 20). Fewer parts allows for easier handling and installation. In addition, the jaw element sections 120 and 170 do not interfit together, as do the jaw elements 25, 26, and 27 (FIG. 1). This also may make installation easier. As noted above, some misalignment of the jaw element sections 120 and 170 may be acceptable in view of the ability of the jaw elements of the sections to move relative to one another, providing some correction for at least some types of misalignment. In addition, as also noted above, relative movement of the jaw elements of the sections may also allow compensation for some mis-alignment of the reinforcing bars 172 and 174, and/or for some variation in the diameter of the reinforcing bars 172 and 174. Further, the jaw element sections 120 and 170 may be able to be used with a wider range of sizes and/or types of reinforcing bars, since the jaw element sections 120 and 170 do not extend fully around the reinforcing bar, and therefore do not have to closely matched in size with the reinforcing bar.

Figure 13:
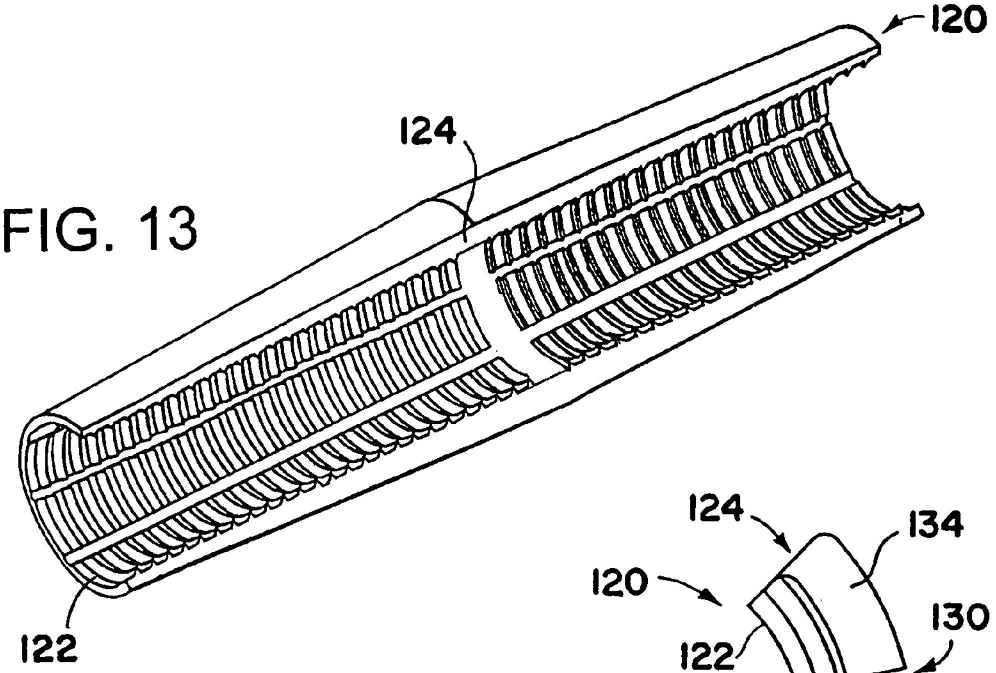
FIG. 13 is an oblique view of another embodiment jaw element in accordance with the present invention, a jaw element with hinge points between jaw element sections.

FIGS. 21–24 shown another hinged jaw element section, a jaw element section 200 with longitudinal (axial) ribs or teeth 202, as an alternative to the annular teeth 122 (FIG. 13). Similar to the jaw element 120 (FIGS. 13–16), the jaw element section 200 has a wall 204 with tapering shallow angle outer surfaces 208 and 210. The wall 204 also has wall notches 212, 214, and 216 therein. Troughs 220 between adjacent of the ribs 202 provide thinned hinge points 222, 224, and 226 at which jaw elements 230, 232, 234, and 236, divided by the wall notches 212, 214, and 216, can pivot relative to one another. It should be noted that a trough does not necessarily correspond in circumferential location to each wall notch. For example, as best shown in FIG. 19, the wall notch 214 has the same circumferential location as a rib 240, rather than one of the troughs 220.

The ribs 202 have rounded corners 242 and 244. The troughs 220 also have rounded corners 246 and 248 at the transition to the adjacent of the ribs 202.

Figure 14:
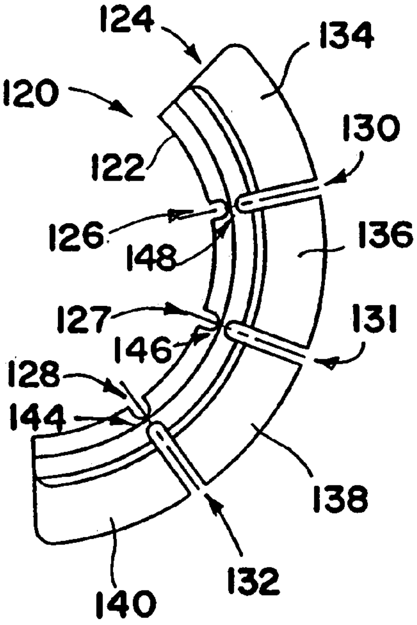
FIG. 14 is an axial end elevation of the jaw element of FIG. 13.
Figure 15:
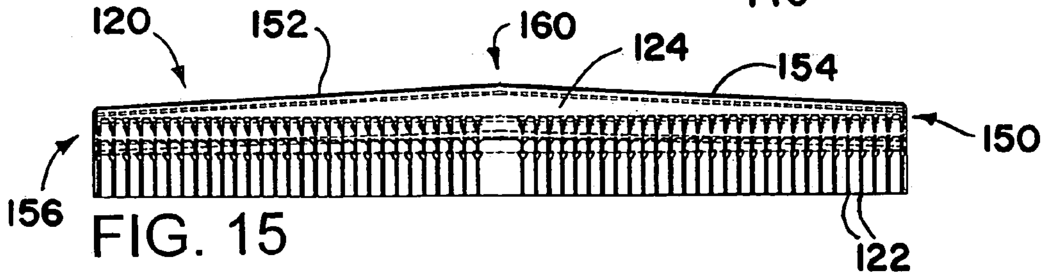
FIG. 15 is a bottom elevation of the jaw element of FIG. 13.
Figure 16:
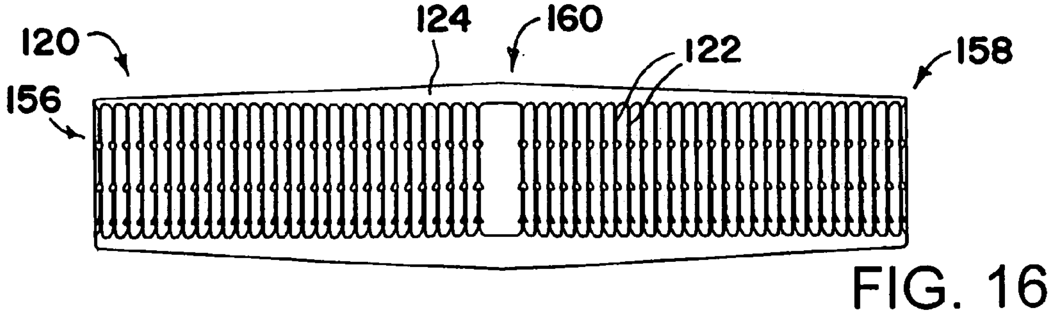
FIG. 16 is a plan view elevation of the jaw element of FIG. 13.

The extent of the jaw element section 200 may be about the same as that of the jaw element section 120 (FIG. 14). That is, the jaw element section 200 may have an extent of about 134 degrees, or about 125 degrees to 140 or 150 degrees, or greater than 120 degrees and less than 180 degrees.

The jaw element section 200 may be made of a softer material than that of reinforcing bars which the jaw element section 200 couples together. Thus the ribs 202 may deform as the jaw element section 200 is pressed against deformations on the outside of reinforcing bar ends to be coupled together.

Figure 25:
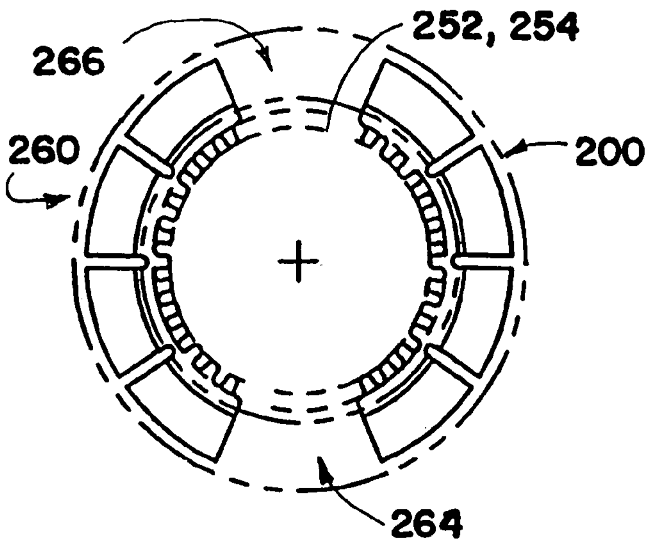
FIG. 25 is an end view illustrating use of two jaw elements of FIG. 21 to grip ends of reinforcing bars
Figure 26:
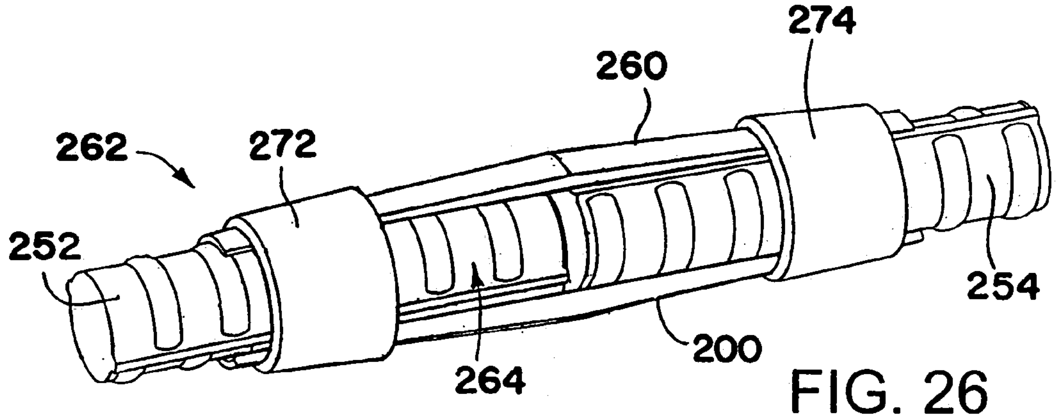
FIG. 26 is an oblique view illustrating the jaw elements of FIG. 25 as part of a splice, with tapered collars used to drive the jaw elements into contact with the ends of the reinforcing bars.

As shown in FIGS. 25 and 26, ends of reinforcing bars 252 and 254 may be joined together by a pair of substantially-identical jaw element sections 200 and 260 as part of a splice 262, with gaps 264 and 266 between the jaw element sections 200 and 260. The jaw element sections 200 and 260 are pressed against the reinforcing bars 252 and 254 by taper lock collars 272 and 274. As noted above, the longitudinal ribs 202 may be deformed by the pressing of the jaw element sections 200 and 260 against the reinforcing bars 252 and 254, specifically against protrusions on along the circumference of the reinforcing bars 252 and 254. Alternatively or in addition, the ribs 202 may deform protrusions of the reinforcing bars 252 and 254.

The jaw element sections 200 and 260 may be substantially identical to one another, and may be placed substantially diametrically opposed on opposite sides of the reinforcing bars 252 and 254. The gaps 264 and 266 therefore may each have an extent of at least 40 degrees.

It will be appreciated that the jaw element sections 120 (FIGS. 13–18) and 200 (FIGS. 21–24) may have a greater or lesser number of jaw elements than is shown in the figures and described above.

The taper lock collars 182 and 184 (FIG. 19), and 272 and 274 (FIG. 26), may be similar to the taper lock collars 32 and 33 (FIG. 1) described above.

Figure 27:
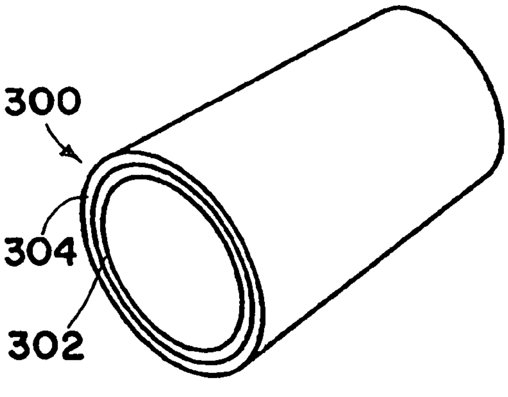
FIG. 27 is an oblique view of an alternate embodiment tapered collar in accordance with the present invention.
Figure 28:
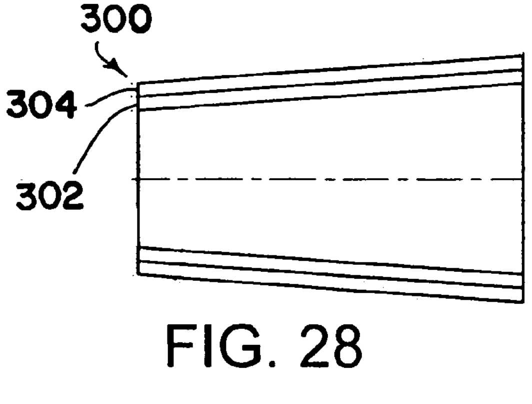
FIG. 28 is a cross-sectional view of the tapered collar of FIG. 27.

Alternatively, taper lock collars such as a taper lock collar 300, shown in FIGS. 27 and 28, may be used to couple together the various types of jaw elements of the above-described embodiments. The taper lock collar 300 includes an inner sleeve portion 302 made of metal, such as steel, and an outer sleeve portion 304 made a tension-resisting material, such as carbon fiber. The inner sleeve portion 302 protects the carbon fibers of the outer sleeve portion 304 from cutting, such as due to sharp edges a jaw element or reinforcing bar. Carbon fibers, such as wound carbon thread, provide greater tensile strength that steel, with less weight and bulk.

It will be appreciated that driving force may be directly applied to a pair of the taper lock collars 300 to drive them onto jaw element sections to secure a pair of reinforcing bars together, for example avoiding the need to use installation collars.

The various taper lock collars described herein may have an inner surface coated with synthetic polymer material, such as a material sold under the trademark TEFLON, or with another suitable lubricant material, in order to reduce friction between the lock collars and the jaw elements or jaw element sections.

Figure 29:
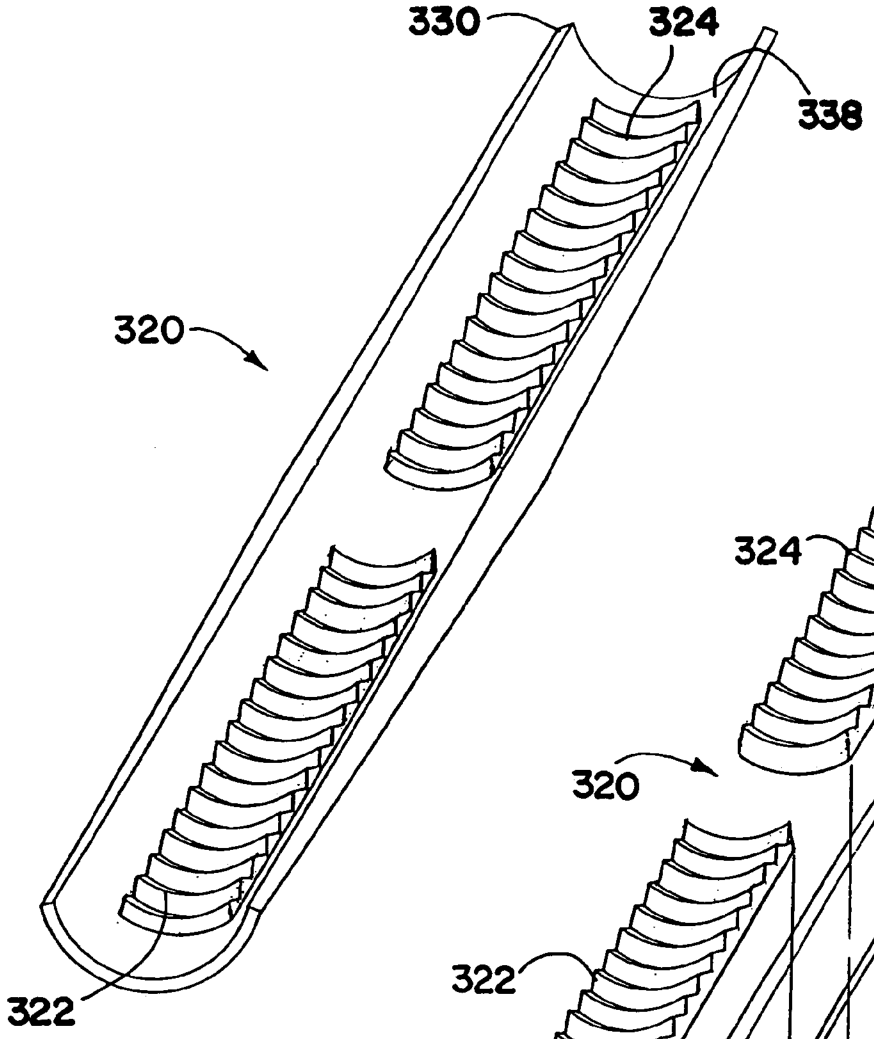
FIG. 29 is an oblique view of one embodiment multi-part jaw element in accordance with the present invention.
Figure 30:
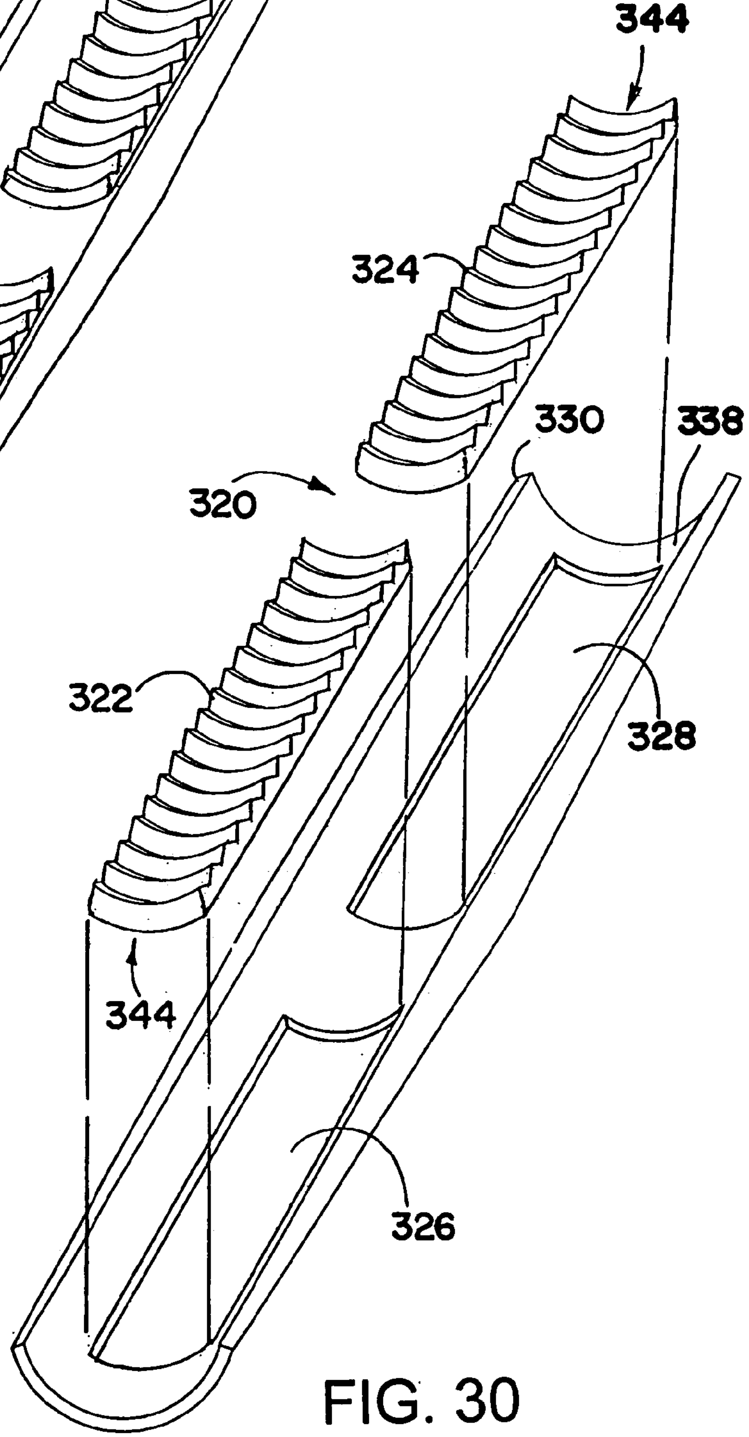
FIG. 30 is an exploded view of the jaw element of FIG. 29.

FIGS. 29 and 30 illustrate another embodiment, a multi-part jaw element section 320 with toothed elements 322 and 324 (also referred to as jaw elements or toothed inserts) that fit into depressions or recesses 326 and 328 in a tapered shell 330.

The tapered shell 330 has tapered outer surfaces 332 and 334, similar to the tapered surfaces of the other jaw element sections described above. However, rather than teeth or ribs on its inner surface, the tapered shell 330 has a smooth (non-toothed) inner surface 338. The inner surface 338 may be curved, as is shown in FIGS. 29 and 30. Alternatively the inner surface 338 may be flat.

The depressions 326 and 328 in the tapered shell 330 receive and secure the toothed elements 322 and 324. The toothed elements 322 and 324 have teeth 344, which may be either symmetrical or asymmetrical teeth. The toothed elements 322 and 324 may be shaped roughly as a parallelepiped, having a flat back and sides, and having a substantially rectangular cross-section in any direction. The teeth 344 may be flat, without curvature. Alternatively, the teeth 344 may have curvature, for example having a curvature corresponding to the reinforcing bars to be joined.

Two or more of the multi-part jaw element sections 320 may be used to join together reinforcing bars, using tapered lock collars to press the teeth 344 of the toothed inserts 322 and 324 into protrusions of the reinforcing bars. As the tapered collars are pressed or driven onto the tapered outer surfaces 332 and 334 of the tapered shell 330. The tapered shell 330 presses inward against the toothed inserts 332 and 324, which are located in the depressions 326 and 328 of the tapered shell 330. The inward pressure against the toothed inserts 322 and 324 drive the teeth 344 into protrusions on the reinforcing bars.

The tooth inserts 322 and 324 and the depressions 326 and 328 may have any of a large variety of suitable shapes. For example, the inserts and depressions may sloped shapes, preferentially orienting one end of the tooth inserts 322 and 324 toward the middle of the tapered shell 330. Such a feature for orienting the toothed inserts 322 and 324 may be desirable when the teeth 344 are asymmetric teeth with a preferred orientation direction.

Figure 31:
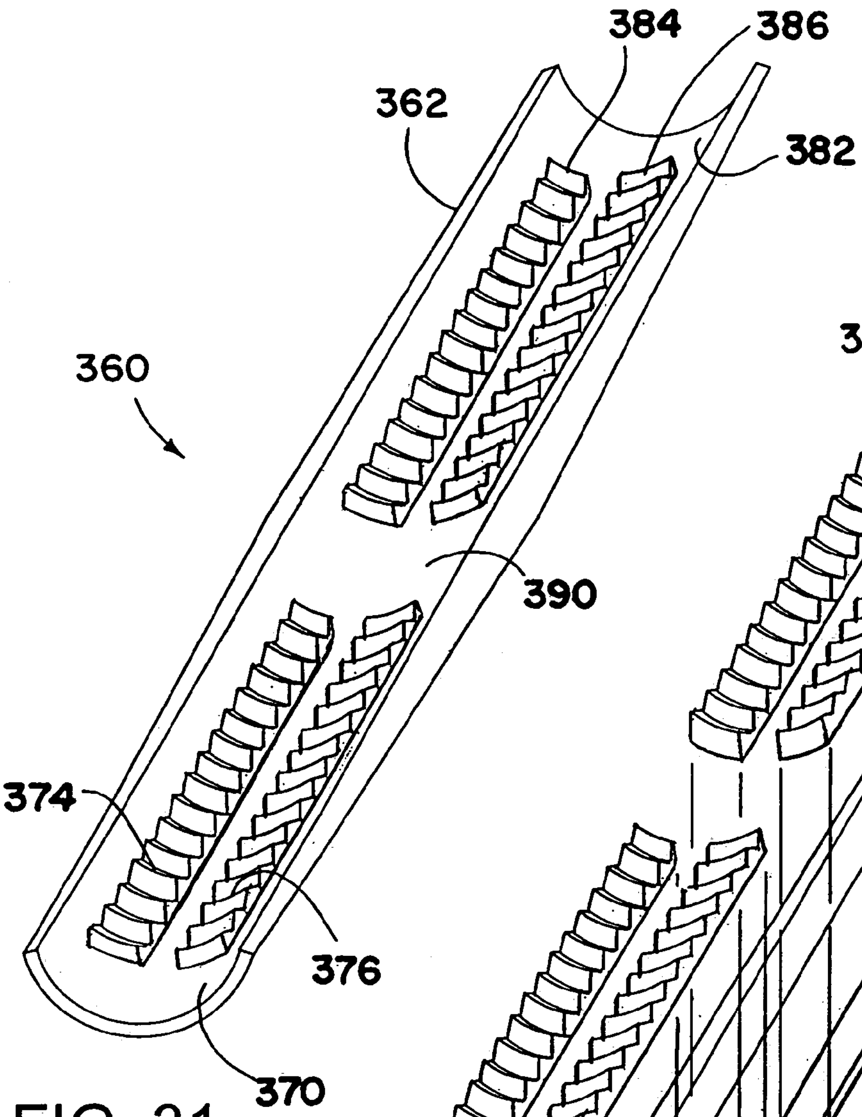
FIG. 31 is an oblique view of another embodiment multi-part jaw element in accordance with the present invention.
Figure 32:
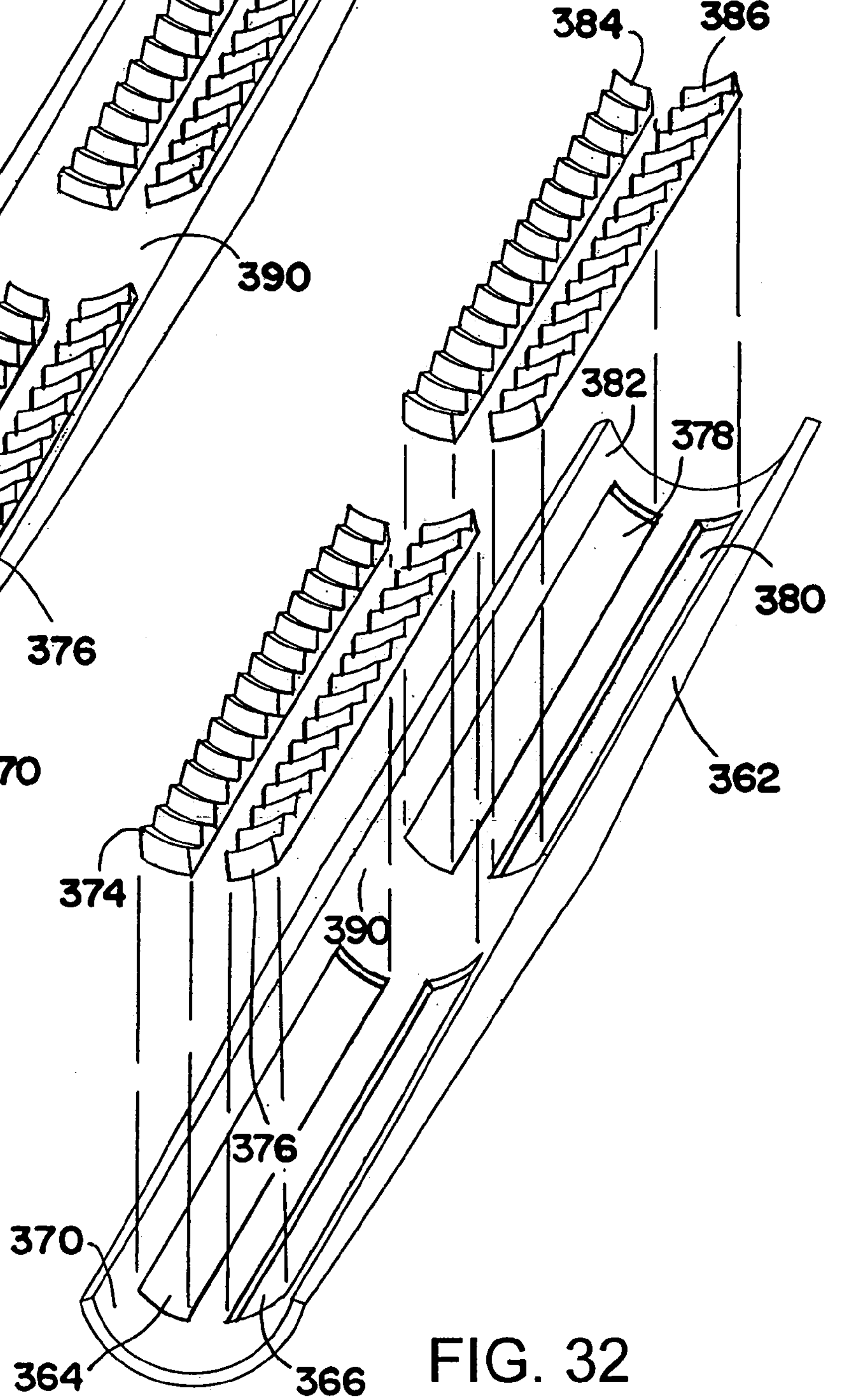
FIG. 32 is an exploded view of the jaw element of FIG. 31.
Figure 33:
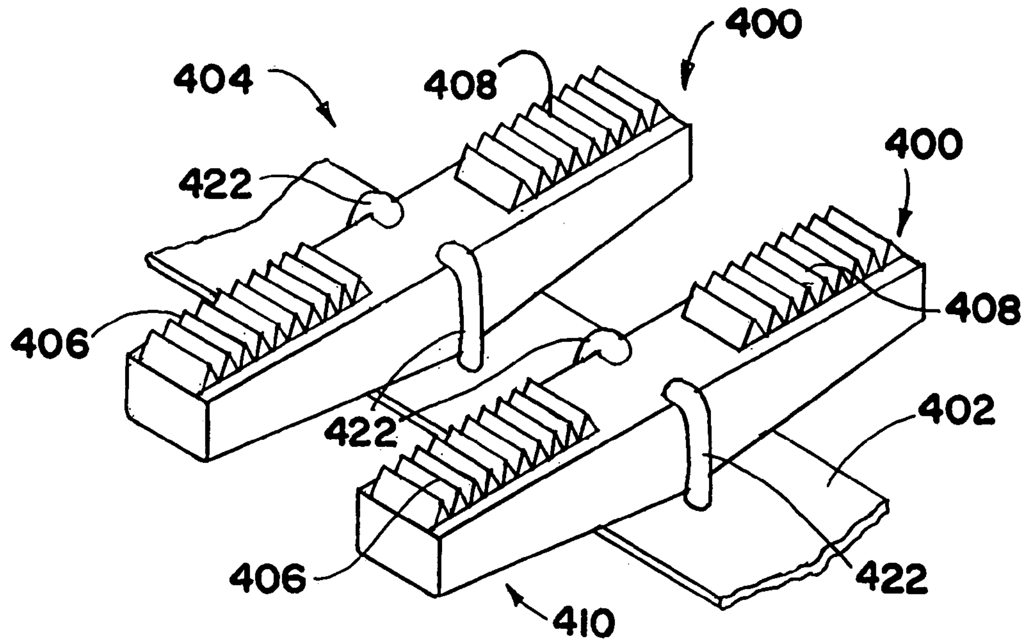
FIG. 33 is an oblique view of one jaw element section embodiment in accordance with the present invention.

Referring now to FIGS. 31 and 32, an alternate embodiment multi-part jaw element section 360 may have multiple toothed inserts on each side or end. A tapered shell 362 of the element has depressions 364 and 366 on one half 370, for receiving toothed inserts (jaw elements) 374 and 376. The shell 362 also has depressions 378 and 380 on the opposite side (half) 382, for receiving toothed inserts 384 and 386. Multiple jaw element sections 360 may be used in combination with suitable tapered collars to join the ends of a pair of reinforcing bars.

The toothed inserts 374, 376, 384, and 386 may have a shape substantially that of a parallelepiped. Alternatively, the toothed inserts may have some curvature.

The depressions 364, 366, 378, and 380 may be oriented so as to direct the teeth of each of the toothed inserts 374, 376, 384, and 386 directly toward the reinforcing bars.

A smooth (non-toothed) inner surface 390 of the tapered shell 362 may be curved (as shown in FIGS. 31 and 32. Alternatively the inner surface may be flat, or may include multiple flat facets, angled to one another.

It will be appreciated that multi-piece jaw element sections may have other configurations than those shown and described above. For example, each side of the jaw element may have three or more inserts. As another example, the toothed inserts could extend across both sides of the tapered shell, for engaging both reinforcing bars to be joined.

It will be appreciated that alternatives to depressions may be used for locating and securing the toothed insert(s). For example, suitable protrusions on the inner surface of the tapered shells may be used. As another alternative, the tapered shell may have a suitably tapered or otherwise shaped inner surface for engaging and securing the toothed insert(s).

The multi-part jaw element sections 320 and 360 may be easier to manufacture than the single-piece jaw elements and jaw element sections of other embodiments. Thus used of multi-part jaw element sections may reduce costs.

Figure 34:
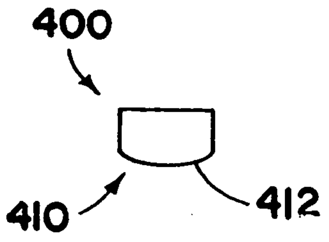
FIG. 34 is a cross-sectional view in an axial direction, showing one possible cross-section shape of the jaw element of FIG. 33.
Figure 35:
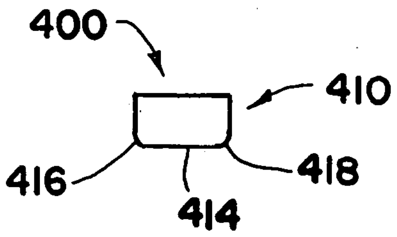
FIG. 35 is a cross-sectional view in an axial direction, showing another possible cross-section shape of the jaw element of FIG. 33.

Turning now to FIGS. 33–37, multiple jaw elements 400 are linked together by flexible web 402 into a jaw element section 404. Each of the jaw elements 400 includes teeth 406 and 408 on an inner surface, for engaging ends of reinforcing bars. A tapered outer surface 410 of each of the jaw elements 400 allows engagement with suitable tapered collars. The tapered outer surface 410 may have a rounded cross-section 412, as illustrated in FIG. 34. Alternatively the tapered outer surface 410 may have a cross-section having a flat portion 414 with rounded corners 416 and 418 on either side, as illustrated in FIG. 35. It is desirable for the tapered outer surface 410 to have a shape that avoids bringing sharp corners into contact with the tapered collars. Such sharp corners could cause scoring or other damage to inner surfaces of the tapered collars.

Figure 36:
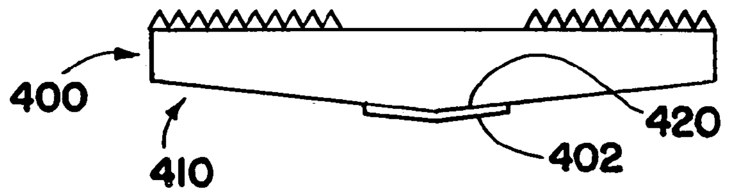
FIG. 36 is a cross-sectional view in a side or circumferential direction, of the jaw element section of FIG. 33.

As best seen in FIG. 36, the web 402 runs along a middle portion 420 of the tapered outer surface 410 of the jaw elements 400. Fingers 422 (FIG. 33) wrap around the jaw elements 400 and secure the jaw elements 400 to the web 402. It will be appreciated that the jaw elements 400 may be secured to the web 402 by any of a variety of other suitable mechanisms, including suitable adhesives, or suitable protrusions or other structures linking the jaw elements 400 and the web 402.

The web 402 may include any of a variety of flexible materials, such as suitable flexible plastics, flexible sheet metal, and/or wire.

Figure 37:
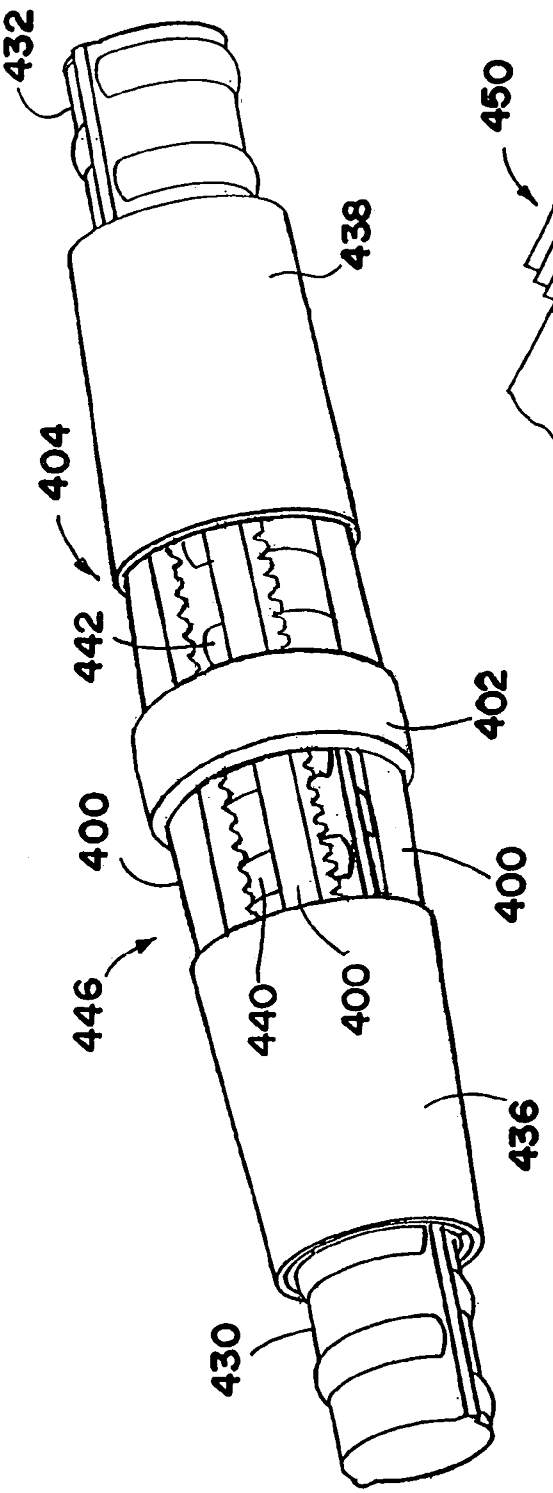
FIG. 37 is an oblique view showing a splice that includes the jaw element section of FIG. 33.

The web 402 and the jaw elements 400 may be a part of a belt or roll having many such elements 400, linked by the web 402. In use, an appropriate number of the jaw elements 400, with the web 402 connecting them, are separated from a belt or roll of jaw elements. As illustrated in FIG. 37, the jaw element section 404 may then be wrapped around ends of reinforcing bars 430 and 432, with collars 436 and 438 forced onto the tapered outer surfaces 410 of the jaw elements 400 to drive the teeth 406 and 408 of the jaw elements 400 into protrusions 440 and 442 on the respective bar ends 430 and 432, thus forming a reinforcing bar splice 446.

The number of jaw elements 400 in the jaw element section 404 utilized may be varied for various sizes of reinforcing bars. The jaw elements 400 may be narrow, such that 5, 7, 9, 11, or more jaw elements 400 may be used to coupled the ends of the reinforcing bars 430 and 432. An odd or even number of the jaw elements 400 may be used, although it may be advantageous to employ an odd number of jaw elements, for example to reduce the likelihood of deforming and/or pressing into the core of reinforcing bars 430 and 432.

The web 402 may be positioned such that the collars 436 and 438 do not touch or otherwise encounter the web 402, as the collars are pressed onto the tapered surfaces 410 of the jaw elements 400.

The web 402 alternatively may be located elsewhere with respect to the jaw elements 400. For example, the web 402 may alternatively run along an inside surface of the jaw elements 400, for example between the teeth 406 and 408, to be located between the ends of the reinforcing bars 430 and 432.

The jaw elements 400 may be substantially evenly spaced along the web 402. Alternatively, there may be some variation in the spacing of the jaw elements 400.

Due to the flexibility of the web 402, the jaw elements 400 are free to move relative to one another, allowing the jaw elements to individually shift to compensate for misalignments of the ends of the reinforcing bars 430 and 432, and/or to compensate for other misalignments or irregularities.

The jaw elements 400 may be formed by such processes as blanking, stamping, or forging. It will be appreciated that the relatively simple shape of the jaw elements 400 may make them inexpensive to manufacture.

It will be appreciated that coupling the jaw elements 400 to the web 402 simplifies installation of the splice 446. In addition, the use of multiple jaw elements 400 on the web 402, as part of the jaw element section 404, advantageously may allow use with various sizes of reinforcing bars, with the number of jaw elements 400 used varying with the size of the bars, as described above.

Figure 38:
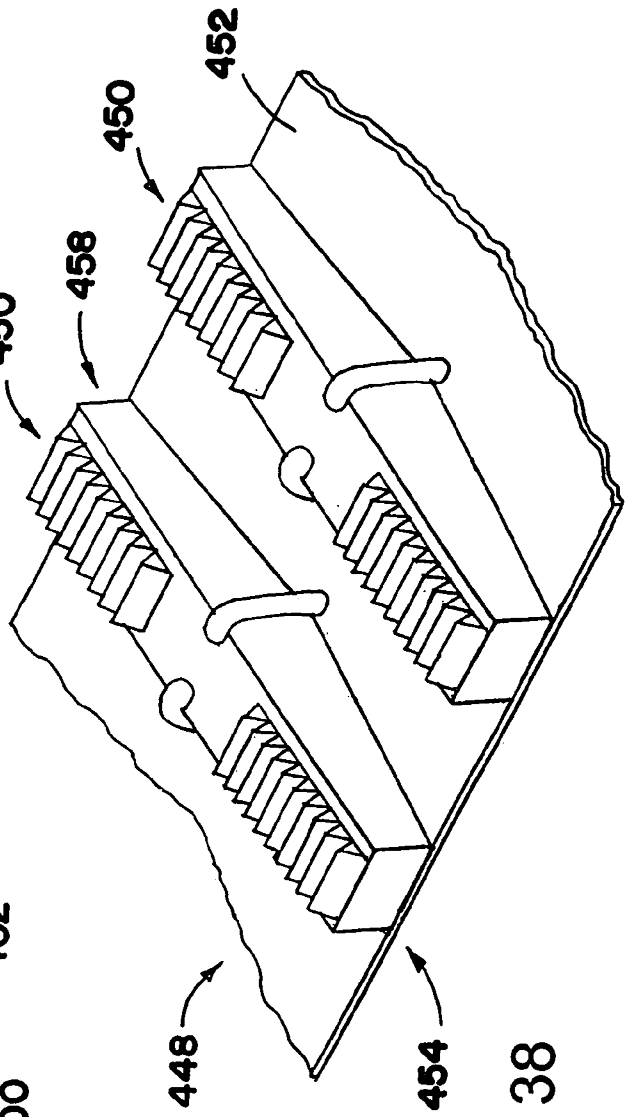
FIG. 38 is an oblique view showing an alternative embodiment jaw element section in accordance with the present invention.
Figure 39:
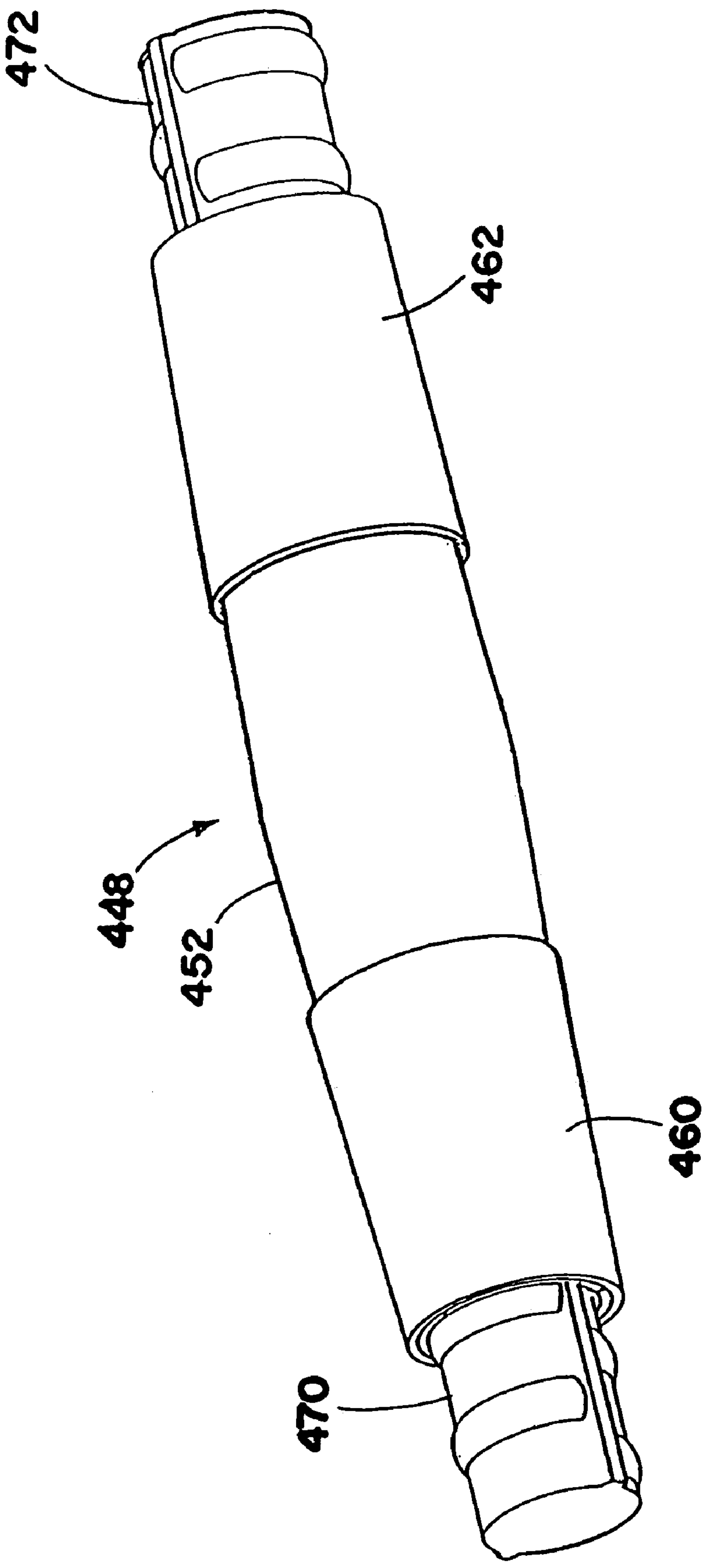
FIG. 39 is an oblique view showing a splice that includes the jaw element section of FIG. 38.

FIG. 38 shows an alternative embodiment, a jaw element section 448 with jaw elements 450 coupled to a web 452 that extends closer to the ends 454 and 458 of the jaw elements 450. As illustrated in FIG. 39, the web 452 extends sufficiently toward the ends 454 and 458 such that at least part of the web 452 is engaged by collars 460 and 462 that compress the jaw elements 450 in toward ends of reinforcing bars 470 and 472, to bite into and secure the ends of the bars 470 and 472. Having the web 452 between the jaw elements 450 and the collars 460 and 462 may advantageously provide reduced friction, relative to that between the jaw elements 450 and the collars 460 and 462, and/or may aid in preventing scoring of or other damage to the collars 460 and 462.

Figure 40:
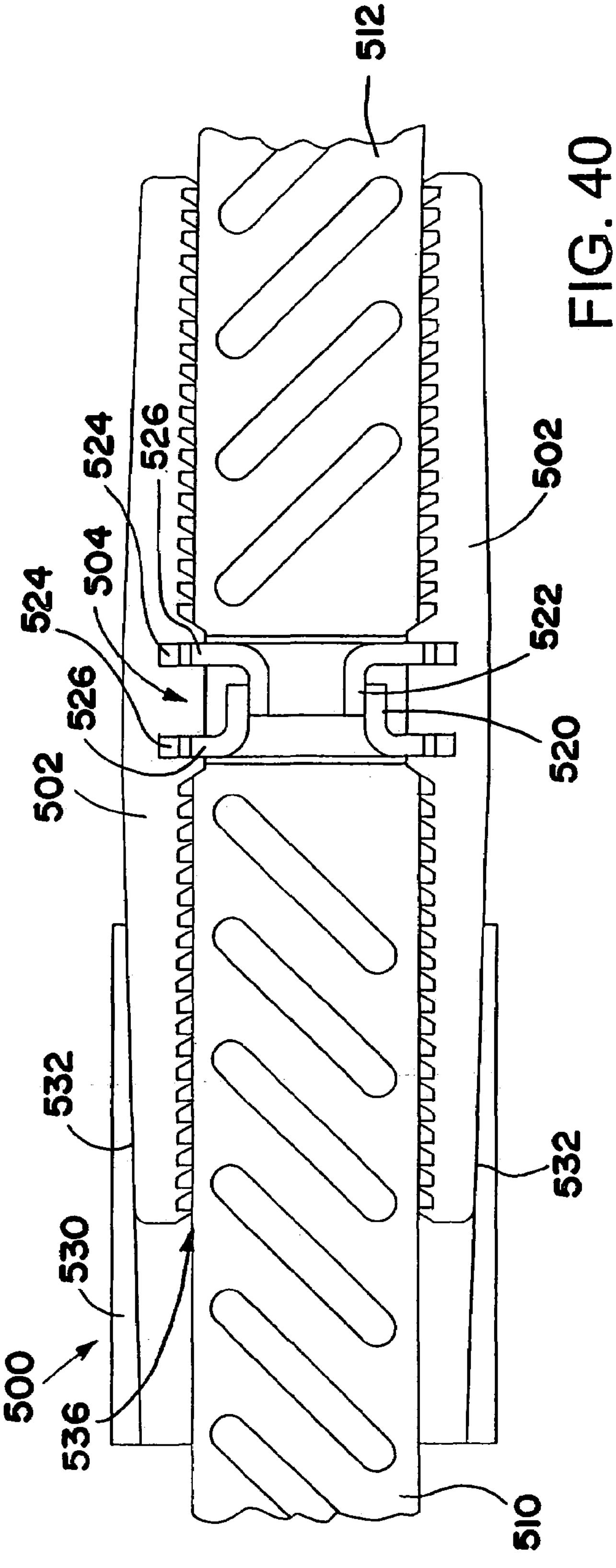
FIG. 40 is a side cross-sectional view illustrating another embodiment of a splice in accordance with the present invention.
Figure 41:
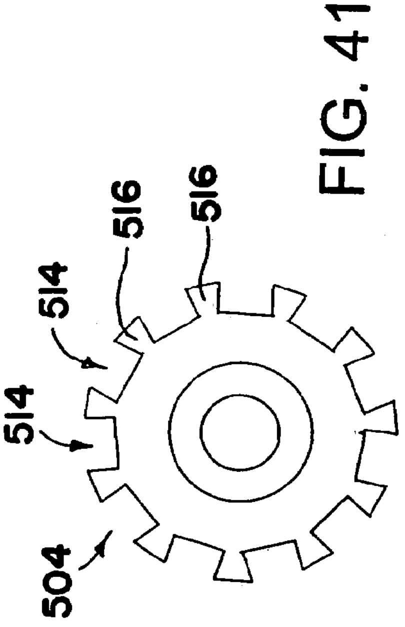
FIG. 41 is an end view of spacer used with the splice of FIG. 40.

FIG. 40 shows another reinforcing bar splice 500, in which jaw elements 502 are supported by a spacer 504 that is placed between ends of a pair of reinforcing bars 510 and 512 to be spliced together. FIG. 41 shows details of the spacer 504, which has a series of spacer notches 514 circumferentially spaced between protrusions 516. The spacer includes a pair of interlocking portions 520 and 522, with aligned spacer notches 514 and protrusions 516.

The jaw elements 502 fit into the spacer notches 514, and have jaw element notches 524 that fit onto edges 526 of the potions 520 of the spacer 504.

A tapered collar 530 engages tapered outer surfaces 532 of the jaw elements 532, driving the jaw elements 502 radially inward such that teeth 536 of the jaw elements 502 bite into and engage the ends of the reinforcing bars 510 and 512.

The spacer 504 may be made of a rigid material. Alternatively, the spacer 504 may be made of a flexible material, such as a suitable plastic, that allows it to deform inward as the jaw elements 502 are pressed radially inward.

It will be seen that the present invention provides a high strength coupler or splice which will qualify as a Type 2 coupler and yet which is easy to assemble and join in the field and which does not require bar end preparation or torquing in the assembly process.

Although the invention has been shown and described with respect to certain preferred embodiments, it is obvious that equivalent alterations and modifications will occur to others skilled in the art upon the reading and understanding of this specification. It will be appreciated that suitable features in one of the embodiments may be incorporated in another of the embodiments, if desired. The present invention includes all such equivalent alterations and modifications, and is limited only be the scope of the claims.

What is claimed is:

1. A reinforcing bar splice comprising:

jaw element sections configured to engage ends of generally axially aligned reinforcing bars; and tapered collars for engaging tapered outer surfaces of the jaw element sections to force jaw elements of the jaw element sections inward to grip ends of the reinforcing bars;

wherein each of the jaw element sections is a multi-part jaw element section including, as separate pieces:

a tapered shell; and one or more of the jaw elements radially inward of the tapered shell, and in contact with the tapered shell, for contacting and gripping the ends of the reinforcing bars; and wherein the tapered shells include the tapered outer surfaces of the jaw element section.

2. The splice of claim 1, wherein the jaw elements fit into corresponding recesses of the tapered shells.

3. The splice of claim 2, wherein the recesses bear against respective back surfaces of the jaw elements.

4. The splice of claim 3, wherein the recesses are shaped to engage respective side and end surfaces of respective of the jaw elements.

5. The splice of claim 4, wherein the jaw elements each have a parallelepiped shape.

6. The splice of claim 4, wherein the jaw elements each have a curved shape.

7. The splice of claim 6, wherein the jaw elements each have teeth along an inner surface and wherein the teeth are asymmetric teeth, each having a slope on one face that is different than a slope on an opposite face.

8. The splice of claim 2, wherein the recesses and jaw elements have corresponding sloped shapes for preferentially orienting the jaw elements within the recesses.

9. The splice of claim 1, wherein, for each of the parts, the one or more jaw elements include jaw elements on respective of the ends of the tapered shell.

10. The splice of claim 9, wherein the each of the parts includes multiple of the jaw elements at each of the ends of the shell.

11. The splice of claim 1, wherein the jaw element section is substantially fully radially external to the reinforcing bars, thus not having any part between the ends of the reinforcing bars.

12. The splice of claim 1, wherein the tapered collars axially engage the jaw element section to force the jaw elements Inward.

13. The splice of claim 1, wherein the jaw elements each have teeth along an inner surface.

14. The splice of claim 13, wherein the teeth are substantially circumferentially oriented.

15. The splice of claim 13, wherein the teeth are asymmetric teeth, each having a slope on one face that is different than a slope on an opposite face.

16. The splice of claim 13, wherein the teeth are symmetric teeth, each having a slope on one face that is substantially the same as a slope on an opposite face.

17. The splice of claim 13, wherein the teeth of the jaw elements are flat, without curvature.

18. The splice of claim 13, wherein the teeth have curvature.

19. The splice of claim 1, wherein the tapered collars have an inner surface coated with a lubricant.

20. The splice of claim 19, wherein the lubricant includes a synthetic polymer material.

21. The splice of claim 1, in combination with the reinforcing bars.

22. The splice of claim 1, wherein the jaw elements each have a parallelepiped shape.

23. The splice of claim 22, wherein the jaw elements each have teeth along an inner surface for gripping the ends of the reinforcing bars.

24. The splice of claim 23, wherein the jaw elements each have a flat back surface and flat side surfaces.

25. The splice of claim 23, wherein the jaw elements each have a rectangular cross section in any direction.

26. The splice of claim 1, wherein inner surfaces of the collars bear radially inward against the tapered outer surface of the tapered shells of each of the jaw element section; and wherein the tapered shells in turn bear radially inward against the at least one of the jaw elements of each of the jaw element sections.

27. A reinforcing bar splice comprising:

at least two jaw element sections configured to engage ends of generally axially aligned reinforcing bars, wherein the jaw element sections include multiple jaw elements physically coupled together; and tapered collars for engaging tapered outer surfaces of the jaw element sections to force the jaw elements inward to grip ends of the reinforcing bars;

wherein each of the jaw element sections is a multi-part jaw element section including:

a tapered shell having the tapered outer surfaces; and at least one of the jaw elements radially inward of the tapered shell, and in contact with the tapered shell, for contacting and gripping at least one of the reinforcing bars; and wherein the jaw elements are parallelepiped-shape jaw elements.

28. A reinforcing bar splice comprising:

a jaw element section configured to engage ends of generally axially aligned reinforcing bars, wherein the jaw element section includes multiple jaw elements; and tapered collars for engaging tapered outer surfaces of the jaw element section to force the jaw elements inward to and ends of the reinforcing bars;

wherein the tapered collars include wound carbon thread; and wherein the tapered collars further include a steel inner sleeve portion between the carbon thread and the outer surfaces of the jaw elements.

* * * * *